(12) United States Patent
Weiss et al.

(10) Patent No.: US 10,081,978 B2
(45) Date of Patent: Sep. 25, 2018

(54) LAMINATED GLASS RETENTION SYSTEM

(71) Applicant: Andersen Corporation, Bayport, MN (US)

(72) Inventors: David J. Weiss, Stillwater, MN (US); Clifford W. MacDonald, Woodbury, MN (US); Loren M. Jacot, Oakdale, MN (US); Joseph Guy Reithmeyer, Afton, MN (US); James Guhl, Hudson, WI (US); Duane Fier, Hudson, WI (US); Scott Thom, White Bear Township, MN (US)

( * ) Notice: Subject to any disclaimer, the term of this patent is extended or adjusted under 35 U.S.C. 154(b) by 252 days.

(21) Appl. No.: 14/854,322

(22) Filed: Sep. 15, 2015

(65) Prior Publication Data
US 2016/0060945 A1 Mar. 3, 2016

Related U.S. Application Data

(62) Division of application No. 13/535,545, filed on Jun. 28, 2012, now Pat. No. 9,163,449.

(60) Provisional application No. 61/526,060, filed on Aug. 22, 2011, provisional application No. 61/503,686, filed on Jul. 1, 2011.

(51) Int. Cl.
*E06B 3/64* (2006.01)
*B32B 17/10* (2006.01)
*E06B 1/40* (2006.01)
*E06B 3/58* (2006.01)
*E06B 3/06* (2006.01)

(52) U.S. Cl.
CPC .......... *E06B 1/40* (2013.01); *B32B 17/10055* (2013.01); *B32B 17/10293* (2013.01); *E06B 3/06* (2013.01); *E06B 3/5814* (2013.01); *E06B 3/64* (2013.01); *E06B 3/5821* (2013.01); *Y10T 29/49826* (2015.01)

(58) Field of Classification Search
CPC . E06B 1/40; E06B 3/5409; E06B 3/56; E06B 3/5814; E06B 3/5821; E06B 3/64; E06B 3/66
USPC .......................................... 156/99, 106, 107
See application file for complete search history.

(56) References Cited

U.S. PATENT DOCUMENTS 2,094,435 A    9/1937  Toney
2,235,680 A *  3/1941  Haven ..................... B23K 1/19
                                                156/106

(Continued)

FOREIGN PATENT DOCUMENTS

DE         2631440 A1 *  9/1977
GB         1189518 A  *  4/1970
WO    WO 2011/062946     5/2011

*Primary Examiner* — Robert Canfield
(74) *Attorney, Agent, or Firm* — Womble Bond Dickinson (US) LLP

(57) ABSTRACT

A laminated glass retention system for securing a laminated glass subassembly within a window sash or frame member or door panel or similar component includes a retention member applied to the laminated glass subassembly. The retention member generally can include a leg portion that engages of the laminated glass subassembly, and can further include a base portion that is coupled to the frame member in which the laminated glass subassembly is seated. The retention member helps retain the insulating glass subassembly within its frame member when subjected to high winds and wind-borne debris.

5 Claims, 19 Drawing Sheets

(56) References Cited

U.S. PATENT DOCUMENTS

| | | | | |
|---|---|---|---|---|
| 2,288,465 | A | * | 6/1942 | Knudsen .................... E06B 3/64 |
| | | | | 126/628 |
| 2,617,159 | A | * | 11/1952 | Leighton ............... E06B 3/5409 |
| | | | | 52/204.593 |
| 2,723,427 | A | | 11/1955 | Bobel |
| 2,854,709 | A | | 10/1958 | Hirtz et al. |
| 2,905,983 | A | | 9/1959 | Ritz |
| 3,105,274 | A | * | 10/1963 | Armstrong .......... E06B 3/66342 |
| | | | | 52/204.593 |
| 3,347,008 | A | | 10/1967 | Strengholt |
| 3,363,385 | A | * | 1/1968 | Evans ....................... E06B 3/60 |
| | | | | 52/476 |
| 3,363,390 | A | | 1/1968 | Crane et al. |
| 3,759,004 | A | | 9/1973 | Kent |
| 3,775,914 | A | * | 12/1973 | Patil ...................... E06B 3/6707 |
| | | | | 52/172 |
| 3,783,084 | A | * | 1/1974 | Quenett ............ B32B 17/10045 |
| | | | | 156/107 |
| 3,872,198 | A | | 3/1975 | Britton |
| 3,919,023 | A | * | 11/1975 | Bowser ............... E06B 3/66342 |
| | | | | 156/107 |
| 3,928,953 | A | | 12/1975 | Mazzoni et al. |
| 3,971,178 | A | | 7/1976 | Mazzoni et al. |
| 3,992,843 | A | | 11/1976 | DiFazio |
| 3,998,680 | A | * | 12/1976 | Flint ....................... C03C 27/10 |
| | | | | 156/107 |
| 4,015,394 | A | | 4/1977 | Kessler |
| 4,055,031 | A | | 10/1977 | Okawa et al. |
| 4,109,431 | A | | 8/1978 | Mazzoni et al. |
| 4,321,777 | A | * | 3/1982 | Sauret .................... B32B 17/10 |
| | | | | 428/412 |
| 4,364,209 | A | | 12/1982 | Gebhard |
| 4,372,094 | A | | 2/1983 | Boschetti |
| 4,496,201 | A | * | 1/1985 | Allgeyer ................. A47F 3/043 |
| | | | | 312/296 |
| 4,615,159 | A | | 10/1986 | Kessler |
| 4,632,853 | A | | 12/1986 | De Vrij |
| 4,693,043 | A | * | 9/1987 | Knapp .................... E06B 1/006 |
| | | | | 49/462 |
| 4,803,820 | A | | 2/1989 | Metrick |
| 4,984,402 | A | | 1/1991 | Davies |
| 5,104,173 | A | * | 4/1992 | Tamura ................ B29C 47/003 |
| | | | | 296/208 |
| 5,193,875 | A | | 3/1993 | Tamura |
| 5,227,206 | A | * | 7/1993 | Bachli ................... B23K 1/015 |
| | | | | 156/107 |
| 5,544,465 | A | * | 8/1996 | Hood ....................... E04C 2/54 |
| | | | | 52/786.11 |
| 5,553,422 | A | | 9/1996 | Gazaway |
| 5,560,149 | A | | 10/1996 | Lafevre |
| 5,593,784 | A | * | 1/1997 | Chinzi .............. B32B 17/10036 |
| | | | | 428/413 |
| 5,622,017 | A | | 4/1997 | Lynn et al. |
| 5,636,484 | A | | 6/1997 | DeBlock |
| 5,637,363 | A | * | 6/1997 | Leray ................ B32B 17/10045 |
| | | | | 156/106 |
| 5,853,828 | A | | 12/1998 | Schimmelpenningh et al. |
| 5,950,379 | A | | 9/1999 | Moore et al. |
| 6,055,783 | A | | 5/2000 | Guhl et al. |
| 6,167,662 | B1 | | 1/2001 | Gruber |
| 6,182,406 | B1 | | 2/2001 | Hunt |
| 6,263,623 | B1 | | 7/2001 | Weiss et al. |
| 6,298,609 | B1 | | 10/2001 | Bifano et al. |
| 6,333,085 | B1 | | 12/2001 | Emek |
| 6,360,499 | B1 | | 3/2002 | Sugiura |
| 6,367,210 | B1 | | 4/2002 | Trundle |
| 6,581,342 | B1 | | 6/2003 | Tavivian |
| 6,931,799 | B2 | | 8/2005 | Webb |
| 7,204,901 | B2 | | 4/2007 | Bayha et al. |
| 7,293,391 | B2 | | 11/2007 | Guhl et al. |
| 7,578,104 | B2 | | 8/2009 | Rinehart et al. |
| 7,775,003 | B2 | | 8/2010 | Sabac et al. |
| 7,877,939 | B2 | | 2/2011 | Knapp |
| 7,950,192 | B2 | | 5/2011 | Glover et al. |
| 8,316,596 | B2 | | 11/2012 | Anderson et al. |
| 8,353,138 | B2 | | 1/2013 | Sigmund et al. |
| 8,683,775 | B1 | | 4/2014 | Jones |
| 8,701,363 | B2 | | 4/2014 | Schield |
| 9,151,540 | B2 | | 10/2015 | Matter, III et al. |
| 9,163,449 | B2 | * | 10/2015 | Weiss ................ B32B 17/10055 |
| 9,440,662 | B2 | * | 9/2016 | Kamaka ................ B61D 25/00 |
| 2005/0028460 | A1 | | 2/2005 | Steffek et al. |
| 2005/0034386 | A1 | | 2/2005 | Crandell et al. |
| 2006/0090834 | A1 | * | 5/2006 | Huang .............. B32B 17/10009 |
| | | | | 156/99 |
| 2007/0209302 | A1 | | 9/2007 | Paz |
| 2008/0280078 | A1 | * | 11/2008 | Krisko .................... B32B 17/06 |
| | | | | 428/34 |
| 2010/0139193 | A1 | | 6/2010 | Goldberg et al. |
| 2010/0212959 | A1 | * | 8/2010 | Flick ................ B32B 17/10036 |
| | | | | 174/84 R |
| 2011/0267833 | A1 | * | 11/2011 | Verrat-Debailleul ....................... |
| | | | | B32B 17/10036 |
| | | | | 362/545 |
| 2014/0072735 | A1 | * | 3/2014 | Jones .................... E06B 3/5814 |
| | | | | 428/34 |

\* cited by examiner

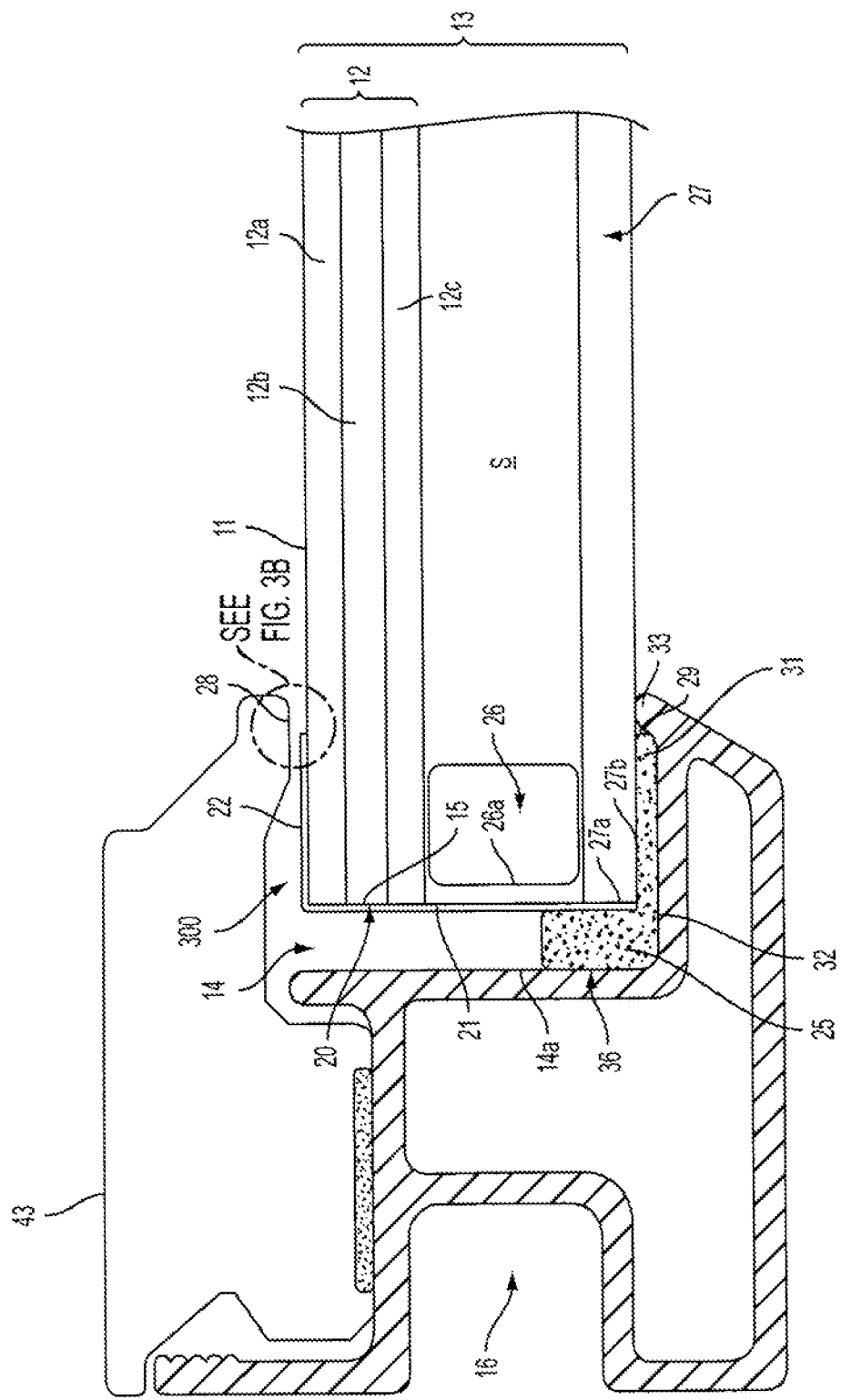

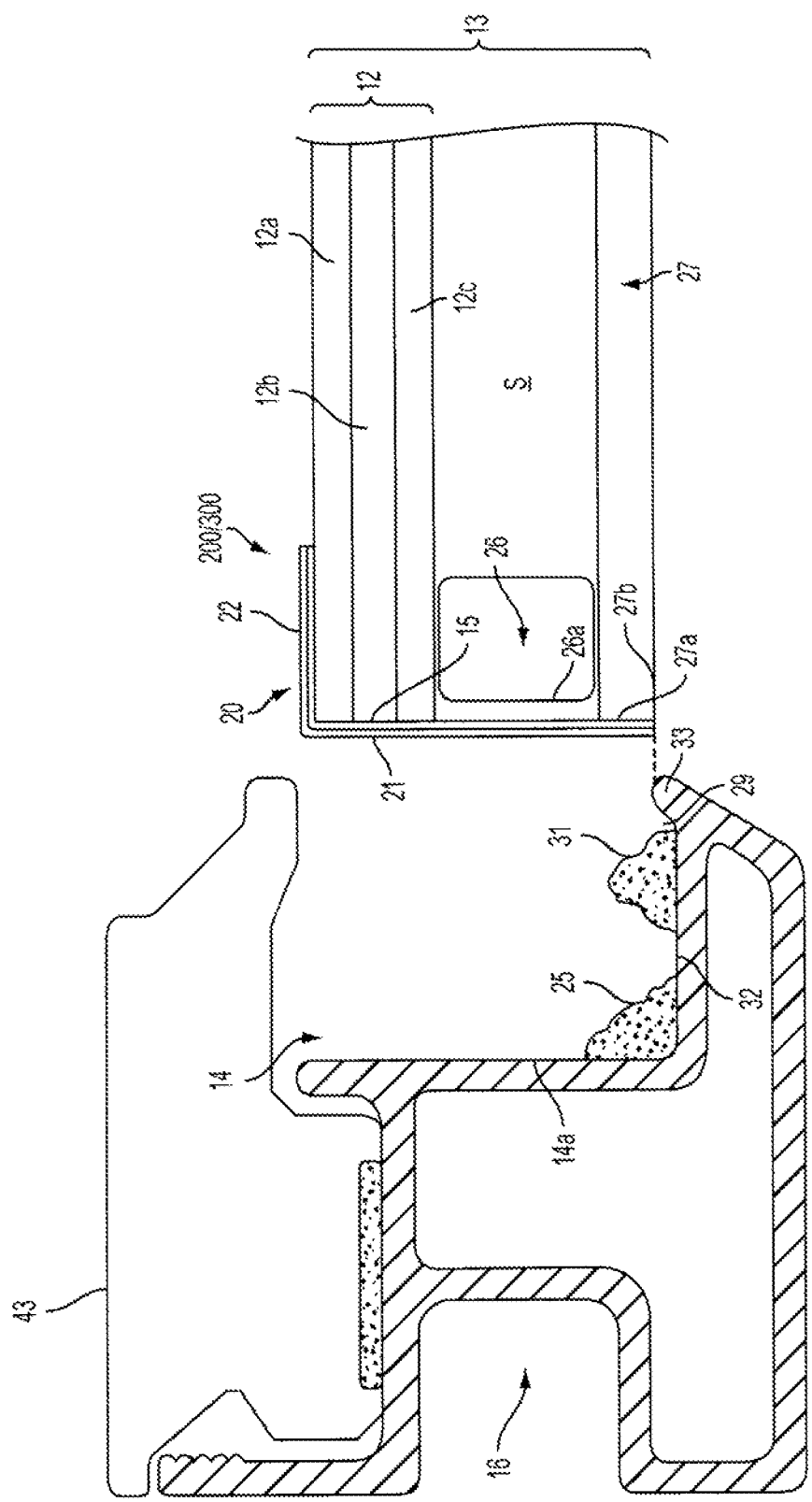

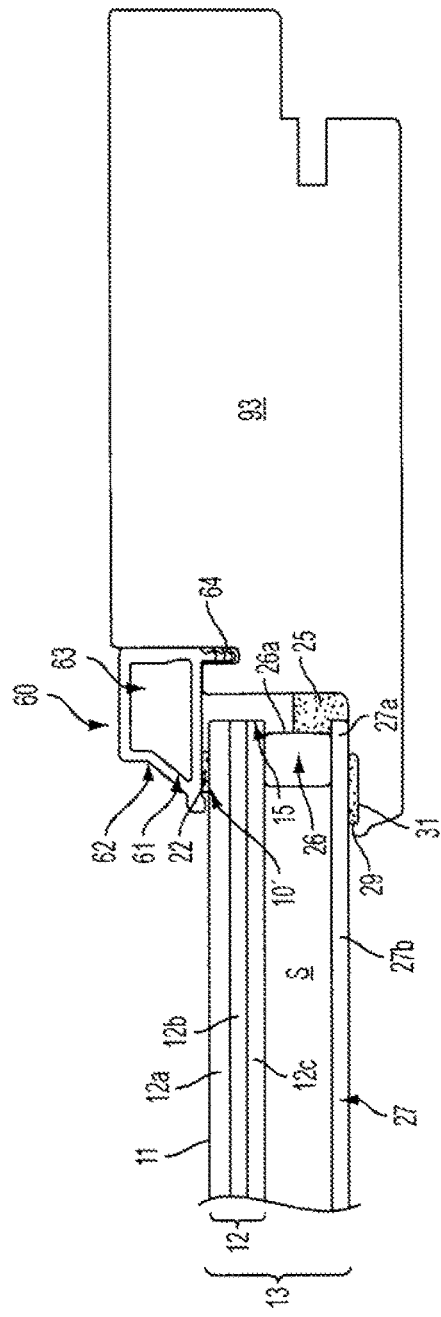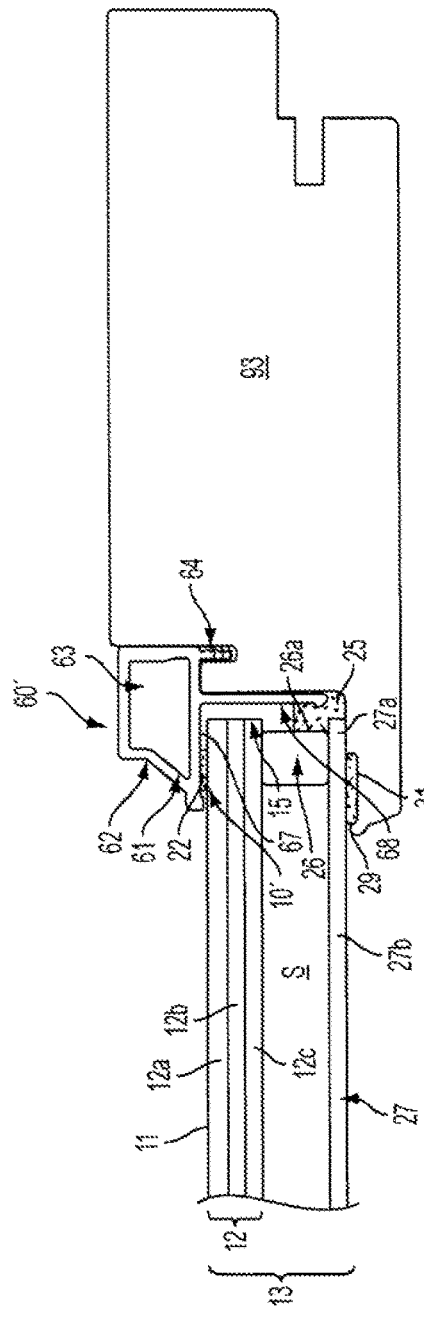

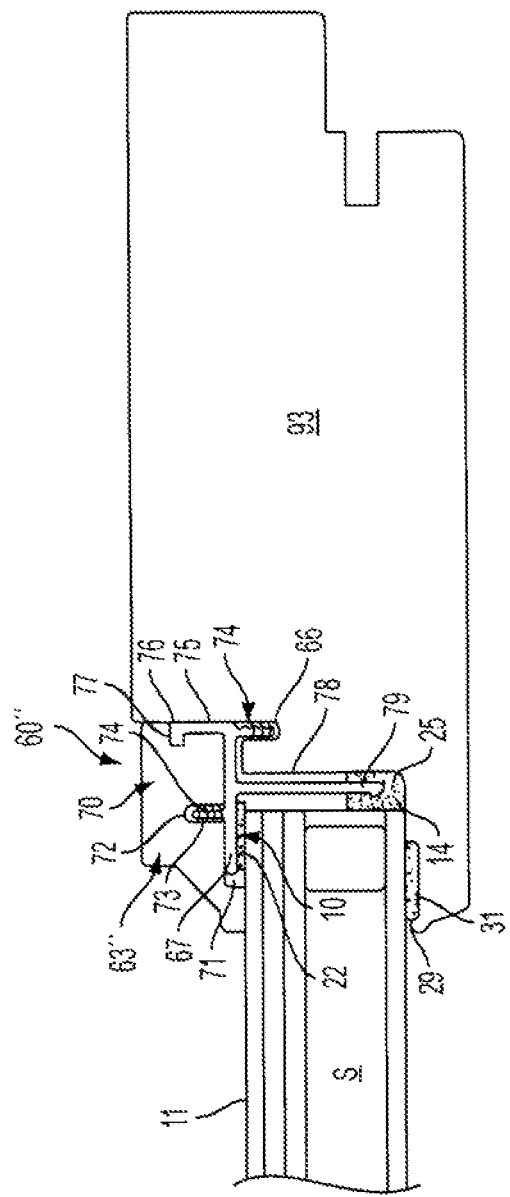

LAMINATED GLASS RETENTION SYSTEM

CROSS REFERENCE TO RELATED APPLICATION

This application is a divisional of U.S. patent application Ser. No. 13/535,545 filed Jun. 28, 2012 which is a formalization of previously filed, co-pending U.S. Provisional Patent Application Ser. No. 61/526,060, filed Aug. 22, 2011 and co-pending U.S. Provisional Patent Application Ser. No. 61/503,686, filed Jul. 1, 2011, by the inventors named in the present Application. This Patent Application claims the benefit of the filing date of these cited Provisional Patent Applications according to the statutes and rules governing provisional patent applications, particularly 35 U.S.C. § 119(a)(i) and 37 C.F.R. § 1.78(a)(4) and (a)(5). The specification and drawings of the Provisional Patent Applications referenced above are specifically incorporated herein by reference as if set forth in their entirety.

FIELD OF THE INVENTION

The present invention generally relates to a system and method for retaining one or more layers of glass within a frame of a fenestration unit, and in particular to a system and method for retaining an insulated glass substantially including a laminated layer of glass providing protection against wind borne debris within a window or door.

BACKGROUND OF THE INVENTION

Given often harsher environmental conditions encountered in coastal areas, there have been increasingly stringent standards, rules and regulations being passed with regard to fenestration units such as windows and doors and the ability of such windows and doors to withstand extreme environmental conditions. For example, in many coastal areas, such as in Florida and along the eastern seaboard, hurricanes and tropical storms having gale force winds and the incidence of wind borne debris are a yearly occurrence and threat. In addition, it is important for the glass subassemblies of such coastal impact windows and doors to be supported and retained within their window sash or frame assemblies or door panel or frame assemblies after impact, and/or after the glass has been broken to provide blast mitigation protection. Still further, these windows and doors generally must provide enhanced insulation capabilities when exposed to temperature extremes, especially in summer months when temperatures in some coastal areas can reach well over 100° F., while in the winter months, temperatures can be well below freezing.

Currently, for the manufacture of coastal impact products, in order to form such products with the desired levels of strength and stability to retain the insulated glass assembly after contact with windborne debris, additional time generally must be spent during the manufacturing process. A common method in the industry to achieve this retention is to add additional glazing material to the gap between the edge of the insulated glass assembly and the sash or frame to increase the bond area between the glass assembly and the sash or frame, in a process commonly referred to as back glazing. Such glazing material must be applied all around the glass edge in a complete and as full an application as possible. This generally requires significant craftsmanship/skill on the part of the workers, and considerable additional manufacturing time to ensure that the back-glazing is sufficient to meet required missile impact and pressure cycling (due to windborne debris) test standards for such coastal impact products. Additionally, this method requires all the work to be done in-line during the assembly of the sash/frame, causing a potential drop in efficiency and capacity of the manufacturing assembly line.

Accordingly, it can be seen that a need exists for a system and/or process that enables the more efficient manufacture of insulated glass fenestration units having laminated glass structures, which meet or exceed required coastal impact product standards.

SUMMARY OF THE INVENTION

Briefly described, the present invention generally relates to a system for the retention of insulating glass subassembly within a window sash or frame assembly or a door panel or frame assembly or other, similar building components, and methods of assembling such reinforced glass subassemblies in such building components. The system and method of the present invention generally includes a retention member that typically comprises a lineal member and can include a resilient body formed from a resilient, flexible extruded or synthetic material. Alternatively, the retention member further could include a fibrous reinforcing tape or fabric material. Still further, the retention member can be formed as a composite material including a series of fibers or other reinforcing tape materials with an adhesive layer being preapplied thereto, or being previously applied to the insulating glass subassembly, with the tape or fibers reinforcing material thereafter being applied over the adhesive layer so as to secure the retention member to the insulating glass subassembly. The retention member engages and supports and retains the insulated glass sub-assembly within the frame of a window sash or frame assembly or door panel and frame assembly to enable transfer of tensile loads from the insulating glass subassembly to the frame upon impact, which provides protection against wind borne debris that meets or exceeds applicable ASTM and TAS large and small impact pressure cycling standards for coastal impact products, as well as applicable ASTM, GSA, AAMA and UFC standards for blast migration protection for such products.

In one example embodiment, the retention member can be formed from a lineal material applied about a proximal end of an insulating glass subassembly. The retention member generally will include a body having a leg portion that can be applied along an inside facing surface of the glass subassembly, and a base portion that extends at an angle away from the leg portion and along the proximal interior edge of the glass subassembly. The base portion of the retention member can be adhered along the interior facing surface and proximal end of a laminated pane assembly of the insulating glass subassembly and attached to an inner edge of an exterior pane of the glass subassembly. In addition, the base portion of the retention member further can be adhered or otherwise connected to a spacer between the exterior pane and the laminated glass pane structure of the glass subassembly to provide additional, expanded surface area contact between the insulating glass subassembly and the retention member. Still further, it is also possible to use a retention member without a leg portion engaging the insulating glass subassembly and with its base portion adhered and secured to the proximal end of the insulating glass subassembly and to the frame channel of the window sash or frame assembly or door panel or frame assembly to retain the insulated glass subassembly within the frame channel.

In one embodiment, the retention member can be applied to the insulating glass subassembly prior to the insulating glass subassembly being mounted within a window sash or frame assembly or door panel or frame assembly, or alternatively can be applied after the insulating glass subassembly has been seated within the window sash or frame assembly or door panel frame or assembly. Typically, a heel bead of a sealing adhesive material will be applied along the channel of the frame in which the proximal end edge of the exterior pane of the insulating glass subassembly will be received, and a bed of glazing material further generally will be applied along a lower portion of the frame channel so as to engage and adhere/seal the exterior facing surface of the exterior pane of the insulating glass subassembly to the frame. When the insulating glass subassembly is applied to the channel of the frame member of the window sash frame assembly or door panel frame or assembly, the base portion of the retention member also generally will be received within the heel bead and bed of glazing material. This not only helps secure the insulating glass subassembly with the frame channel, but also connects the retention member to the window sash or frame assembly or door panel or frame assembly as well.

In an alternative embodiment, the retention member can comprise a hinged member formed along the frame of the window sash frame or assembly or door panel frame or assembly at an interior end of the channel thereof. The hinged retention member can be formed as a part of the frame and can be folded over into a position so as to engage the interior facing surface of the laminated pane structure of the insulating glass subassembly. An adhesive material, including an adhesive bead, tape material or other, similar adhesive further can be applied between the surface of the pivoting retention member and the interior facing surface of the laminated pane structure so as to adhere the retention member to the laminated pane structure of the insulating glass subassembly.

In still a further alternative embodiment of the present invention, the retention member can be used in conjunction with an interior glass stop for windows or doors, and which is adapted to engage and connect to the window sash or frame assembly or door panel or frame assembly. At least one barbed spline can be formed along a proximal side of the body of the interior glass stop, and can be inserted into locking engagement with a kerf of the interior sash or door panel component. A reinforcing member can be applied between a lower surface of the interior glass stop and the interior facing surface of the laminated glass structure of the insulating glass subassembly to help seat and secure the insulating glass subassembly between the frame of the window sash or frame assembly or door panel or frame assembly and the interior glass stop. The interior glass stop further can include a downwardly projecting leg, or, alternatively can be formed with a two-piece structure with a separate connector that attaches to and secures the body to the interior sash component.

In another embodiment, the combination of the retention member and interior glass stop can be assembled to form a reinforced window sash or frame assembly or door panel or frame assembly, by first applying the retention member to the glass subassembly, and then the interior glass stop can be mounted to the window sash or frame assembly or door panel or frame assembly by placing the body of the interior glass stop over the interior surface of the glass subassembly and urging the barbed spline thereof into the kerf of the interior sash component, and with the connector leg projecting into and becoming at least partially enveloped by the heel bead of sealant. Once the sealant has cured, the glass stop will be further rigidly tied to the glass subassembly and to the window sash or frame member or door panel or frame assembly.

Various features, objects and advantages of the present invention will become apparent to those skilled in the art upon a reading of the following detailed description, when taken in conjunction with the accompanying drawings.

DESCRIPTION OF THE DRAWINGS

FIG. 3A illustrates yet another additional embodiment of the present invention incorporating the use of a fibrous or reinforced tape material for the retention member.

FIG. 7F is a cross-sectional view, taken along lines 7F-7F of FIG. 7E, illustrating the engagement of a frame member with a glass stop pre-applied thereto, with the insulating glass subassembly.

FIGS. 10A-10C are cross-sectional views illustrating alternative configurations of the present invention incorporating the retention member and glass stop of FIGS. 9A-9D.

Figure 1:
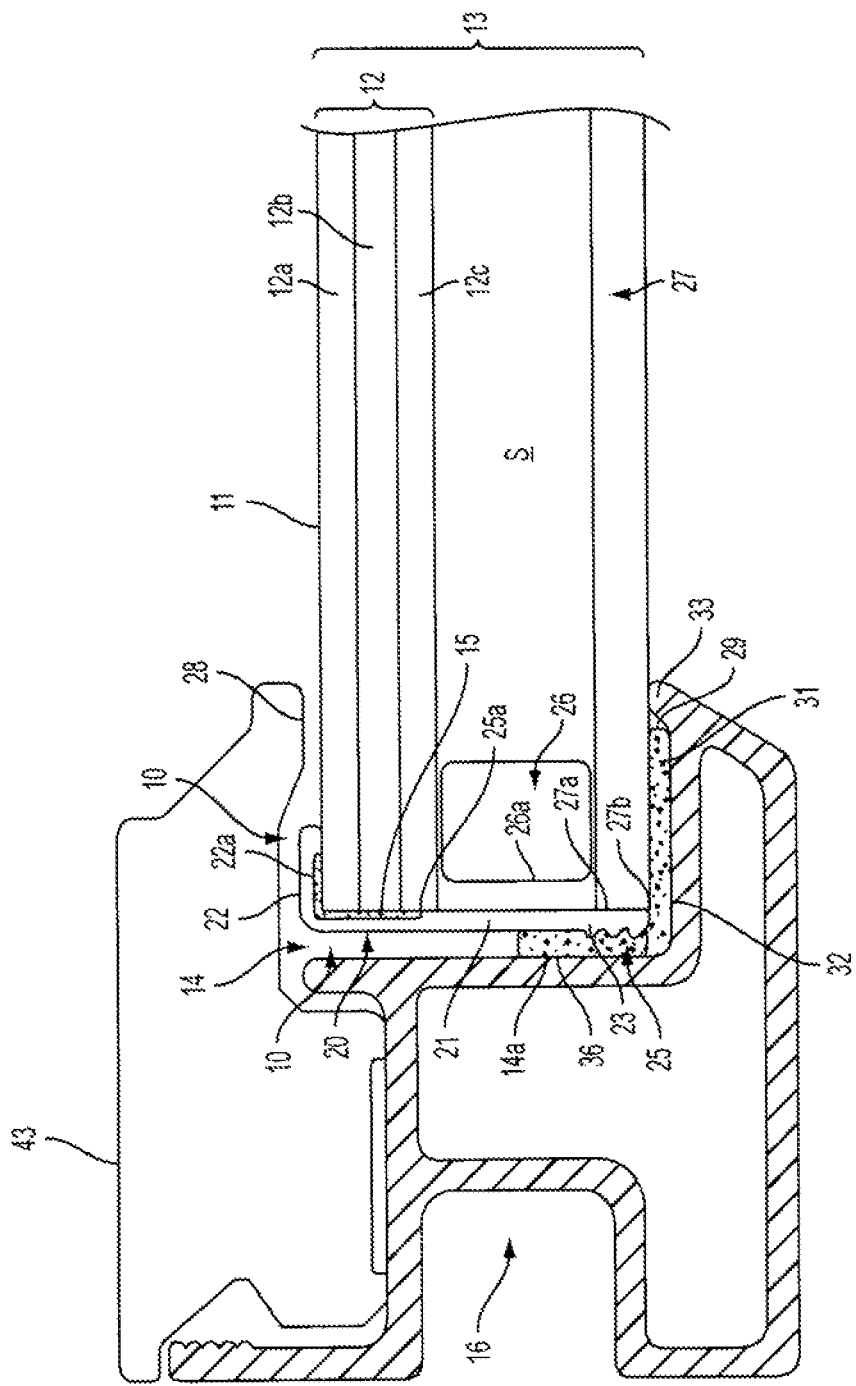
FIG. 1 illustrates an embodiment of an insulated glass fenestration unit having a laminated glass structure according to the principles of the present invention and utilizing a PVC glass retention member.

Those skilled in the art will appreciate the various advantages and benefits of the various embodiments of the present invention upon reading the following description of the invention and the embodiments thereof, with reference to the drawing figures. In addition, those skilled in the art will understand that, according to common practice, the various features of the drawings discussed below are not necessarily drawn to scale, and that dimensions of various features and elements of the drawings may be expanded or reduced to more clearly illustrate the embodiments of the disclosure.

DESCRIPTION OF THE INVENTION

The present invention generally relates to a system and method for retaining layers of glass, and in particular a laminated layer of glass of a glass subassembly that is designed to provide protection against windborne debris in a window, door or other fenestration unit that meets or exceeds applicable ASTM and TAS large and small missile impact and pressure cycling standards for coastal impact products, as well as applicable ASTM, GSA, AAMA and UFC standards for blast mitigation protection. The present invention is designed to enhance the efficiency and cost effectiveness of the manufacture of such windows, doors or other fenestration units by enabling easier and more efficient assembly of a coastal impact product that typically will include an insulating glass subassembly incorporating a laminated glass structure along the rearward side thereof. The present invention further can be incorporated into any window or door or other fenestration product that is exteriorly glazed with the laminated glass layers arranged toward an inside portion or region of the window or door, and is illustrated in the attached drawings in various example embodiments. It further will be understood by those skilled in the art that while example window sash or frame assembly or door panel or frame assembly constructions and measurements or dimensions may be shown in the attached drawings, such constructions, measurements and dimensions are for descriptive and illustrative purposes only and should not be taken as limiting the scope of the present invention.

For illustrative purposes and not limitation, an example of such glass subassemblies is shown at 13 in the FIGS. 1-2B, 3A, 4A-4B, 5B, 6B-6C, and 7B-10C. As used herein, the term glass subassembly will include transparent window components such as insulating glazing units, laminated glass panes, and other like fenestration components. One example glass subassembly 13 is an insulating glazing unit comprising a first, or exterior, pane of glass 27 and a laminated glass pane/structure 12 at a rearward side thereof so as to be facing an interior side of the window or door and exterior pane 27 facing outwardly. As shown in FIG. 1, the laminated pane structure 12 can include a series of panes 12a-12c, and defines a second, or interior pane of glass 12a that defines an interior facing or inside surface 11 for the glass subassembly, wherein the panes are held together in a parallel spaced apart manner by a peripheral sealing spacer 26 so as to define a space S between the panes that can contain air or other gas. The insulating glass subassembly will be received within a channel 14 of the sash or frame member 16 of a window or a door panel or frame member, and further generally will be adhered thereto with a bed of glazing 31 and a heel bead of glazing 25 typically including a silicone glazing material or other, similar material to meet applicable coastal impact product regulations and standards, applied within or along the channel as illustrated in FIGS. 1, 2A-2B and 3A.

In one embodiment, the second, or interior, pane is of the well known shatterproof type comprising a laminate of two glass panes adhered to one another by an intervening layer of polymeric material. The shatterproof feature of the second pane reduces the likelihood of pieces of glass becoming dangerous projectiles once impacted on the exterior side by windborne debris. The shatterproof feature of the second pane also reduces the likelihood of piercing or creating a hole through the glass subassembly from wind borne debris impacting the exterior side of the subassembly, thus preventing the envelopment of the structure from becoming pressurized by hurricane force winds.

FIG. 1 portrays an edge portion of a window unit comprising a portion of glass subassembly 13, a sash or frame member 16, and a glass stop 43. Glass subassembly 13 is adhesively attached and sealed to surface 32 of sash or frame member 16 by bed glazing adhesive 31. The structural integrity of the window unit can be enhanced by back glazing additional bed glazing material that extends along inner surface 14a of frame channel 14 so as to provide additional bonding area and to place a portion of the bond in shear loading rather than tensile loading. This additional adhesive is commonly called a heel bead, shown at 25 in the Figs. In this embodiment, a glass stop 43 having an inwardly projecting edge 28 also can be attached, by mechanical, adhesive, or other suitable means, to sash or frame member 16 to improve the appearance of the window unit, and may also contribute to the structural integrity of the unit.

The choice of adhesive compositions useful for bed glazing 31 and heel bead 25 is not particularly limited, provided the adhesive materials exhibit adequate adhesion and sealing for the life of the window or door. Silicone materials such as silicone RTV (room temperature vulcanizing) sealants are well known to be useful for attaching and sealing glass members to frames or sashes. Hot melt silicone materials have also been found useful. Both types of silicone materials are available in various grades from Dow Corning Corporation, Midland, Mich. Adhesives and sealants based on polyurethane, polyamide, polyvinyl acetate, other known polymers, and copolymers and other combinations thereof, may also be useful. It will be appreciated that the material used for the heel bead in a particular window or door application need not be the same as the material used for the bed glazing in that window or door. For example, since the heel bead adhesive material and the bed glazing adhesive material typically bond to surfaces having different surface adhesion properties, it may be beneficial to choose different adhesive materials for the heel bead and the bed glazing to optimize bond strength. Additionally, it may be beneficial to choose heel bead materials that optimize mechanical integrity, while choosing bed glazing materials that optimize sealing between a glass surface and the sash.

As illustrated in FIG. 1, the present invention includes a retention member 10 that is adhered to an inside facing surface 11 and edge 15 of the laminated pane/structure 12 of the insulated glass sash assembly 13, which itself is received within the channel 14 of the window sash or frame member 16. In alternative embodiments, retention member 10 also may be attached to an end edge 27a of the first or exterior pane 27 of the glass subassembly 13. It will be understood that in yet other embodiments, sash or frame member 16 may instead be a frame of a door panel, a fixed window frame, or other structure surrounding and supporting a glass subassembly. As illustrated in FIG. 1, the retention member 10 generally is a lineal member formed with a body 20 having a substantially L-shaped configuration, including a base portion 21 and a laterally extending projection or leg 22 that extends at approximately a 90° angle away from the base portion. Additionally, the retention member could be formed with a substantially U-shaped construction, extending around both facing surfaces 11/27b of the glass subassembly, as long as it does not interfere with the bed glazing and the engagement/contact between the bed glazing and the glass subassembly. As a further alternative, the retention member could comprise a unitary member attached to the proximal edge 15 of the glass subassembly 13, without a leg portion engaging the inside facing surface 11 of laminated pane/structure 12, and with the base portion of the retention member extending into and being coupled/secured to the frame channel 14 by the bed glazing 31 and/or heel bead 25.

Figure 7A:
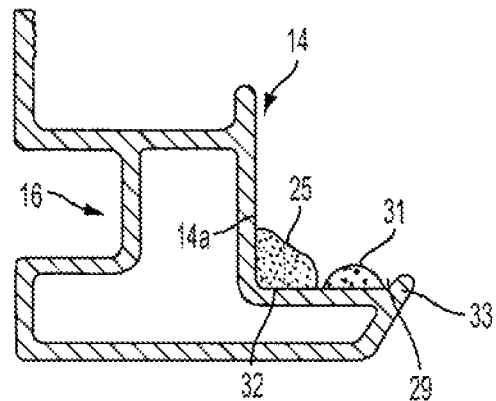
FIGS. 7A-7D are schematic illustrations of an alternative embodiment of a process for applying the retention member to the laminated glass structure after assembly of the glass subassembly and sash or frame member.
Figure 7B:
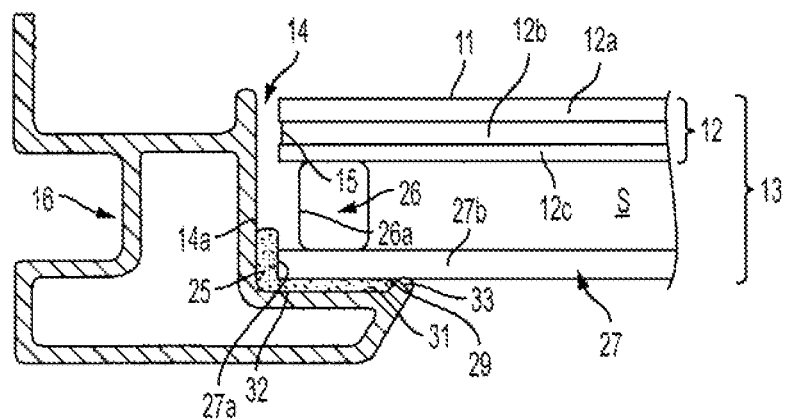
Figure 7C:
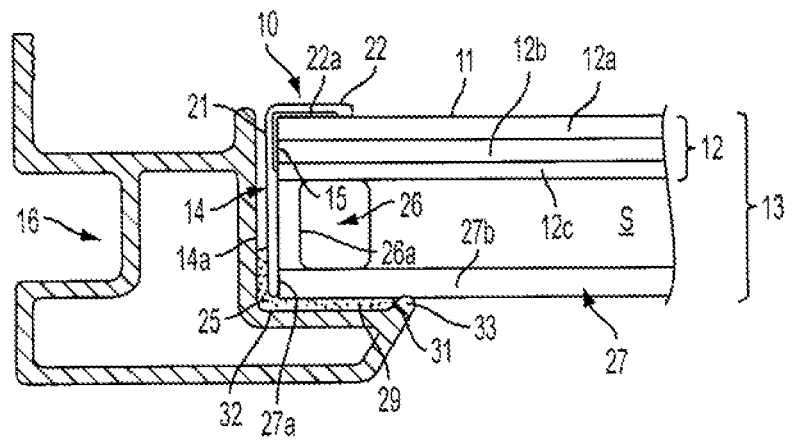
Figure 7D:
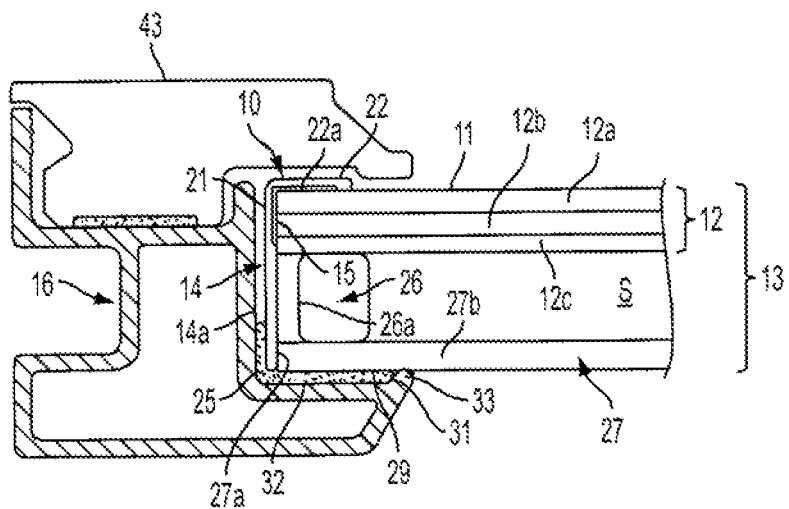
Figure 7E:
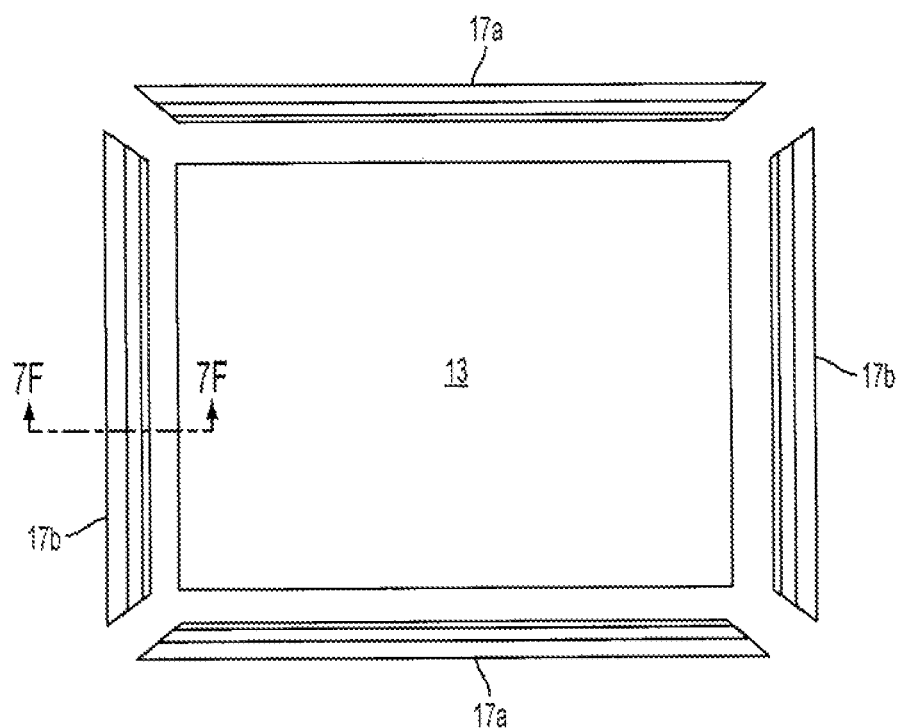
FIG. 7E is a plan view illustrating the engagement of a frame member with a glass stop pre-applied thereto, with the insulating glass subassembly.

Retention member 10 further may include other features, such as an adhesive channel or recess 22a formed along the body 20, which defines a pocket adapted to receive an adhesive material 25a therein to adhere the body to the glass subassembly. Additionally, ribs 23, or other engaging features that can increase the area of contact of the retention member with the heel bead and/or bed glazing also can be used, which may improve the attachment of retention member 10 to heel bead 25 by extending into and engaging the heel bead as shown in FIG. 1 so as to substantially secure the retention member into the heel bead and channel. As shown in FIGS. 7C-7D, such ribs are optional and are not necessarily required. In alternative embodiments, surface 14a may also include ribs serving a similar function. Alternative embodiments in which ribs 23 mechanically interlock with corresponding ribs formed along surface 14a of the channel 14 are also contemplated.

Retention member 10 may be produced by extrusion of a polymeric material such as polyvinyl chloride (PVC), though other polymeric materials may also be suitable. The extruded retention member stock may be cut into one or more individual sections for each side of glass assembly 13, or may be provided in longer sections and notched at corner locations to permit bending around corners. In yet other embodiments, retention member 10 may be produced as a single component that frames the glass subassembly 13, by, for example, injection molding, thermoforming, or other processes suitable for the production of framing members. Retention member 10 may be installed on the glass subassembly 13 either before installation of the glass subassembly 13 onto sash or frame member 16, or after.

As in the case of bed glazing and heel bead adhesives, the choice of adhesive for attachment of the retention member to the insulating glass subassembly also is not particularly limited, provided the adhesive bonds with sufficient strength to at least portions of the associated surfaces of the insulating glass subassembly and to the retention member, and provided that the bonding is long-term, without significant bond deterioration over the life of the window. An adhesive that has been found suitable is VHB transfer adhesive, available from 3M Company, of Maplewood, Minn. The VHB adhesive, which can be laminated to the retention member and is provided with a removable liner to protect the adhesive until the retention member is ready for application to the glazing unit, at which time the liner typically will be removed just prior to application. It also can be useful to apply a primer to the interior side of the glass subassembly and/or other surfaces to which the adhesive materials for attachment of the retention member to the insulating glass subassembly, prior to application of retention member 10 in order to further improve adhesion of retention member 10 to the glass. Suitable primers are available from 3M, as well as from other sources. Suitable methods for applying liquids, in particular the primer, to solid surfaces in well-defined strips are also well-known, and include the use of sponges, rollers, and combinations thereof, as well as other like fluid application devices. In other embodiments, retention member 10 may be attached to subassembly 13 by a flowable adhesive such as a silicone material of the type used in bed glazing.

In accordance with the method of the present invention, after manufacture of the insulating glass subassembly 13, the retention member 10 generally can be adhered to the insulating glass subassembly. This can be done off-line or potentially at an outside vendor who is responsible for the manufacture of the insulating glass subassembly. The retention member can be applied using various adhesives or using other known methods for bonding the retention member to the outside edge 15, or the outside edge 15 and the interior proximal edge 27a of the insulating glass subassembly that is to be received within the channel 14 of the sash or frame member 16 or other fenestration frame.

Methods of assembly of a window sash or frame member assembly or door panel or frame assembly are illustrated in more detail in FIGS. 6A-6C and 7A-7F. In the method shown in FIGS. 6A-6C, bed glazing material 31 and the heel bead material 25 can be applied to surface 32 prior to placement of subassembly 13. Subassembly 13, with retention member 10 pre-installed thereon, can then be placed onto bed glazing material 31 and heel bead material 25 and pressed down against edge 33. Glass stop 43 is then installed, using, for example, adhesive or other attachment methods known in the art. If necessary, the adhesive materials are then allowed to cure for a period of time prior to further handling of the assembled unit. Alternative assembly methods, shown in FIGS. 7A-7F, follow the same sequence as that in FIGS. 6A-6C, with the exception that retention member 10 is not pre-installed on subassembly 13. Rather, subassembly 13 is first installed onto surface 32, using bed glazing material and heel bead material, as before. Retention member 10 can then be installed by pressing it into place, so that its lower edge is embedded in heel bead 25. Finally, glass stop 43 is indicated in FIGS. 6B-6C and 7B-7F. It will be recognized that this method requires that retention member 10 be sufficiently rigid to penetrate the heel bead during installation.

In yet another embodiment, in a process called groove or channel glazing, separate glass stop members can be first attached to their respective sash or frame members prior to assembling the sash or frame members into a complete sash. An example of such a process is illustrated in FIG. 7F and described in U.S. Pat. Nos. 6,167,662, 5,622,017, and 4,615,159, which are incorporated by reference as if set forth fully herein. Bed glazing materials and heel bead materials are then put in place on the appropriate channel surfaces of each of the sash members, after which the sash members can then be slid into place over the edges of glass subassembly 13, where their ends meet at the corners to form a complete sash surrounding glass subassembly 13. It will be recognized that when this glazing method is used, sash members and glass stop members need not be separate parts, but can be produced as single units having channels for receiving the edges of the glass subassembly, thereby further adding to the strength of the assembled unit in resisting impact from wind borne debris. In addition, in such an embodiment, the retention member generally will be pre-applied to the glass subassembly prior to its insertion into the sash assembly.

Referring again to FIG. 1, retention member 10 itself can be formed in different sizes, thicknesses and/or lengths, with the base or leg portions thereof being of varying lengths depending upon the size and configuration of the channel within the window sash or frame member or door panel or frame member and/or the profile thereof. For example, in one embodiment indicated in FIG. 1, the base portion can be approximately 0.795-1.00 inches in length while the leg portion can be approximately 0.240-0.250 inches. It will be understood, however, that the leg and base portions can be of greater or less lengths and can be of varying thicknesses as needed to ensure a matched, engaging fit and seating within the channel 14 without interfering with the proper fit or seating of the insulating glass subassembly within the channel. Portion 21 of retention member 10 may extend to corner 27b of first pane 27, but may also extend for shorter distances or longer distances, provided that it extends for a sufficient distance into heel bead 25 to provide adequate retention strength, in accordance with applicable large and small missile impact and pressure cycling and blast mitigation standards for coastal impact products, and without interference with the contact/engagement between the bed glazing and the glass subassembly, and without requiring additional fasteners to secure the glass subassembly within the frame channel.

The retention member 10 further can be formed from a variety of natural, metal, composite or synthetic materials, such as a polyvinyl chloride and glass composites, flexible polyvinyl chloride, polyethylene, nylon, elastomeric materials, or other, similar materials and/or combinations thereof that have sufficient strength and mechanical properties regarding tensile strength and rigidity, and further potentially a desired amount of elongation and/or shock absorption or energy dissipation capabilities to transfer tensile loads from impact from the glass subassembly to the frame of the window sash or frame assembly or door panel or frame assembly to enable the glass subassembly withstand impacts, and retain the laminated layer of glass within the channel of the window sash or frame member or door panel or frame member by substantially supporting and retaining the glass subassembly following impact and/or pressure cycling. It may also be useful for retention member 10 to exhibit elastic or visco-elastic properties that allow it to undergo elongation or deformation of the retention member following impact and/or pressure cycling.

Figure 2A:
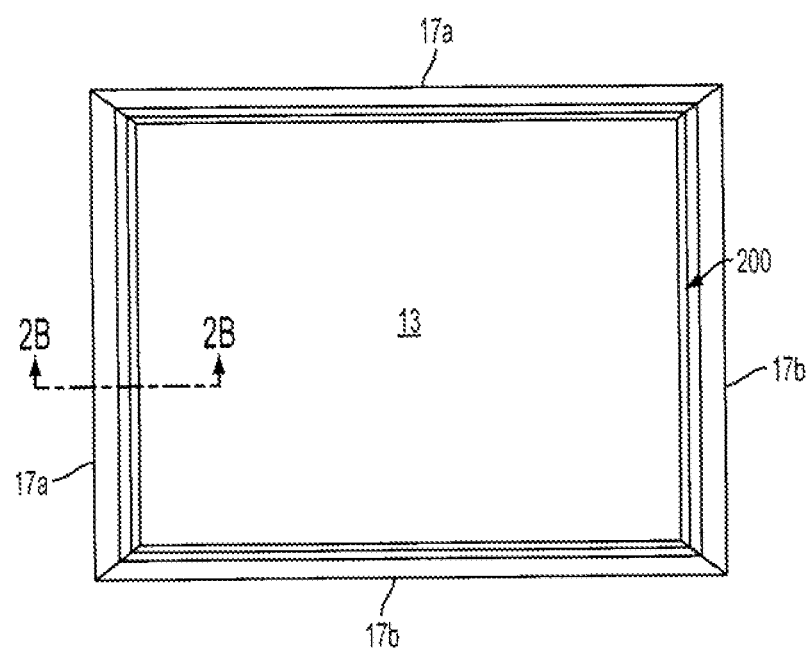
FIG. 2A is a plan view illustrating the engagement of a frame member with a glass stop pre-applied thereto, with the insulated glass assembly.
Figure 2B:
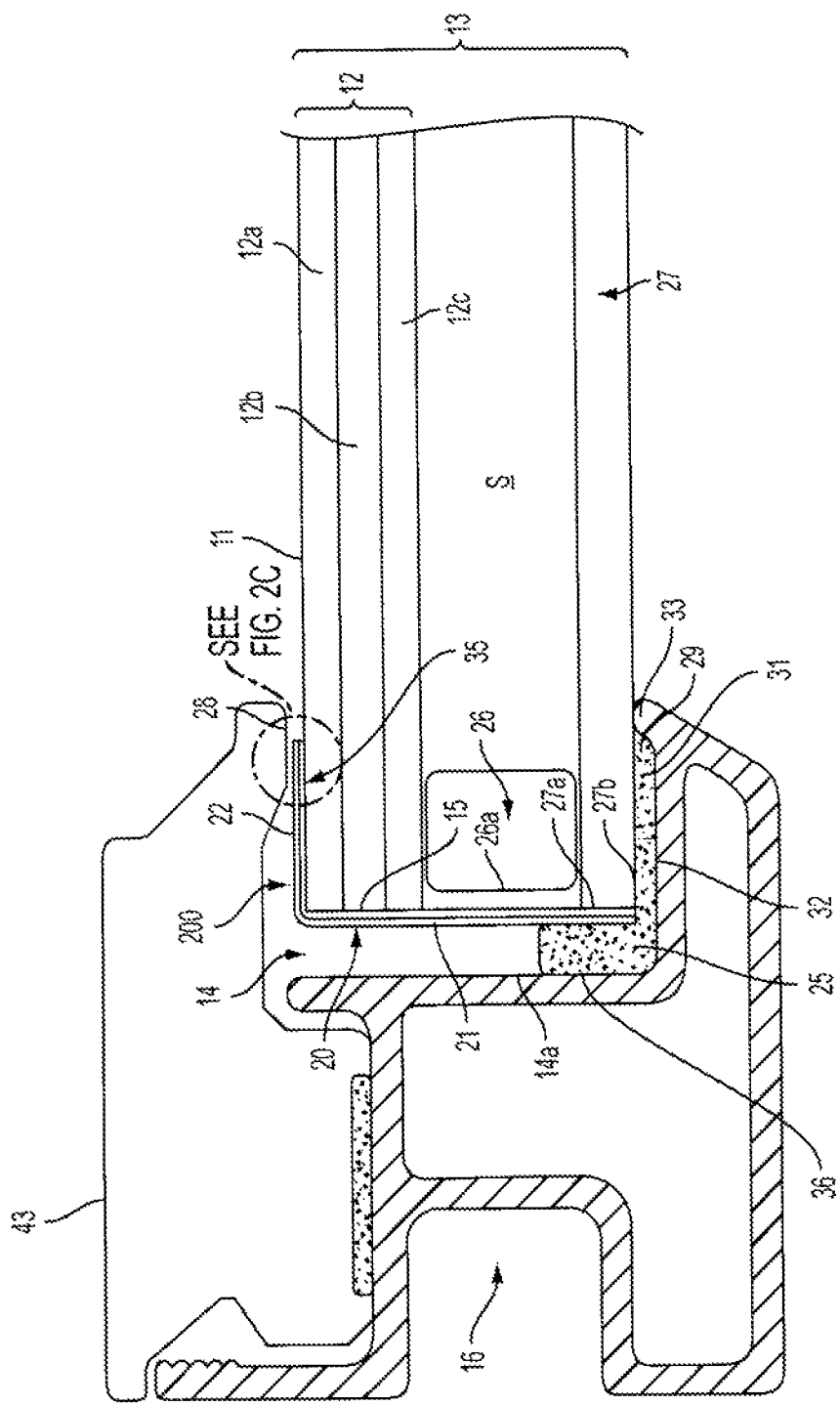
FIG. 2B is a cross-sectional view, taken along lines 2B-2B of FIG. 2A, of an additional embodiment of the present invention incorporating a VHB tape material combined with a fiberglass cloth for the retention member.
Figure 2C:
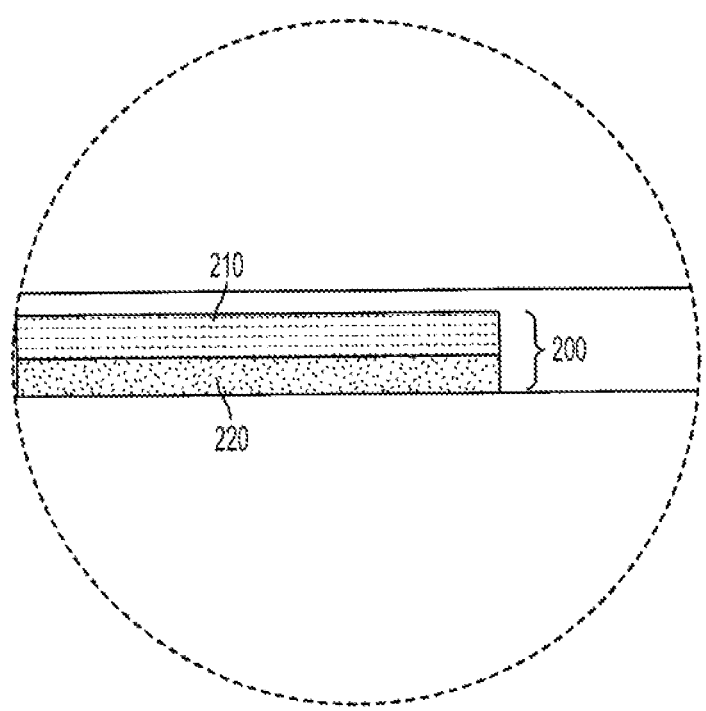
FIG. 2C is a cross-sectional view of the retention member of FIGS. 2A-2B.

Referring to FIGS. 2A-2C, in another embodiment, retention member 200 can be formed from a composite, tape-like stock material 38 having a width W=X+Y, wherein X is the length of projection 22 and Y is the length of base portion 21, and comprising a flexible backing covered on one side by a pressure sensitive adhesive. The choice of backing material is not particularly limited, provided that it is sufficiently flexible to be formed into the shape of retention member 200 and able to stretch while absorbing energy during impact while further exhibiting sufficient tensile strength to withstand the impact and pressure cycling loads to which it will be subjected. Particularly useful backing materials are those containing fiberglass fabric or similar fibrous fabric materials, which may be either woven or non-woven. In addition, various sheet or film materials may also be useful. Other fabrics, either woven or non-woven, may also be useful.

Referring to FIGS. 2B and 2C, the retention member 200 comprises composite member 38 that can include a flexible backing 210 (FIG. 2C) with adhesive layer 220 attached thereto. Backing layer 210 may be a fabric, such as a fiberglass or a polymeric fabric, either woven or nonwoven. In some embodiments, backing layer 210 may be a fiberglass screen material. In yet other embodiments, backing layer 210 may be a film or other flexible sheet material. When backing layer 210 is a film or sheet material, it can comprise a polymeric material reinforced with fibers or other known reinforcement materials. While it is useful for backing 210 to be sufficiently flexible to be easily folded into place during installation on the glass subassembly, it may also be useful in other embodiments for backing 210 to soften at elevated temperatures, so that it can be heated and pre-folded prior to installation.

Retention member 200 is adhesively bonded, at a first edge, to inside surface 11 (FIG. 2B) of laminated panel 12, and bonded at a second edge to heel bead 25. Bonding of the retention member 200 to heel bead 25 can be enhanced by embedding a portion of it into heel bead 25, as shown in FIG. 2B. Adhesive layer material, an acrylic, or other similar adhesive or bonding material 220 (FIG. 2C) may be a pressure sensitive adhesive material such as 3M VHB adhesive. This adhesive layer can be of various thicknesses, varying the thickness of the adhesive layer may provide more flexibility or cushioning, which could increase the time duration of the energy transfer, thus reducing the load transferred, while experiencing impact or pressure cycling loads. In some embodiments, a fabric backing may be at least partially embedded in the adhesive layer.

The ability of glass subassembly 13 (FIG. 2B) to withstand impact loading can be enhanced by providing a more resilient, that is to say more robust, coupling between subassembly 13 and sash 16. In some embodiments, it may be useful to increase the flexibility of this coupling by reducing the thickness and elastic moduli of backing material 210 used in the retention member. In addition, in some embodiments the strength of the coupling between subassembly 13 and sash 16 also may be affected by bonding of retention member 200 to edges 15 and/or 27a of the glass subassembly 13, and possibly to edge 26a of the spacer 26, such as with a layer of an adhesive material. As a result, resistance to impact or blasts may be enhanced by bonding retention member 200 to one or all of edges 15, 27a and 26a, so as to provide increased surface area control and coupling between the retention member and the components of the glass subassembly, thereby allowing enhanced engagement and/or grip onto subassembly 13 during impact or blasts.

Figure 3B:
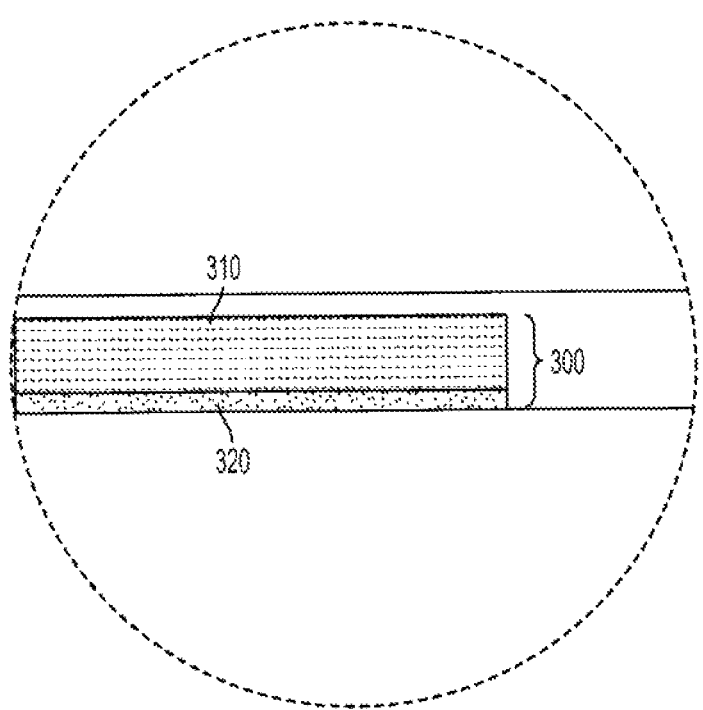
FIG. 3B is a cross-sectional view of the retention member of FIG. 2A.

In yet another embodiment, illustrated in FIGS. 3A and 3B, retention member may comprise a composite structure 300 that can include a backing layer 310 (FIG. 3B) with adhesive 320 adhesively bonded thereto. Backing 310 may comprise a fabric or other fibrous material contained in a polymeric matrix and adhesive layer 320 may be a pressure sensitive adhesive of the general type conventionally used in pressure sensitive adhesive tapes. Alternatively, adhesive layer 320 may be a heat activated adhesive. In yet other embodiments, backing 310 may be a fabric, either woven or nonwoven, and adhesive layer 320 may be an adhesive material that at least partially penetrates layer 320 while in addition providing an adhesive layer. Other backings and adhesive layers that meet the requirements for a retention member will be apparent to one skilled in the art.

In yet another embodiment, a flexible retention member may be supplied without adhesive, and an adhesive layer may be applied to a suitable edge portion of surface 11 prior to application of the flexible retention member. Optionally, adhesive may also be applied to edge surfaces 15 and 27a prior to application of the flexible retention member, and further can be applied to the edge 26a of spacer 26 to further enhance the surface contact and grip of the retention member. The applied adhesive may, in some embodiments, be an adhesive such as 3M VHB transfer adhesive. In other embodiments, the adhesive may be a flowable adhesive such as silicone RTV adhesive, or a heat activated adhesive such as a hot melt adhesive. Still further, the adhesive used for attachment of the retention member could be applied to the glass subassembly, for example, by skim coating the surfaces of the glass subassembly with an adhesive, such as a silicone adhesive, and thereafter applying the tape material of the retention member over the adhesive layer to adhere it to the glass subassembly.

Figure 4A:
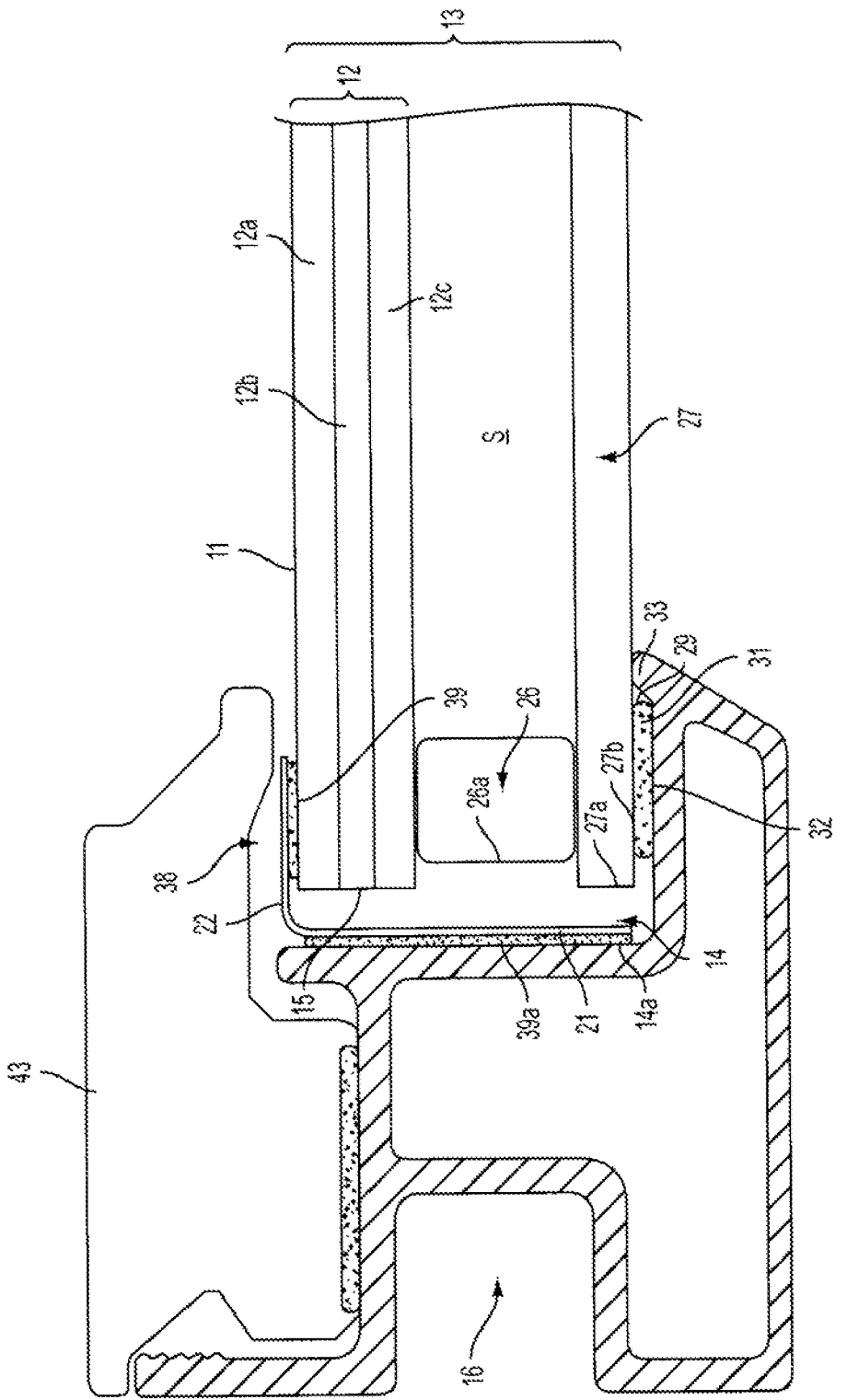
FIG. 4A is a cross-sectional view of still a further embodiment of the present invention incorporating a fibrous or reinforced tape material for the retention member.

Referring to FIG. 4A, in yet another embodiment, retention member can comprise a reinforcing or fibrous tape material 38, is bonded to inside surface 11 of subassembly 13 and to sash wall 14a such as by an adhesive layer 39a. The retention member 38 may be rigid or flexible. When the retention member is rigid, it can enhance retention of subassembly 13 in sash or frame assembly or door panel or frame assembly 16, in the manner previously described for other embodiments. When the retention member is flexible, it may allow considerable movement of subassembly 13 relative to sash or frame assembly or door panel or frame assembly 16. This may be useful in controlling the manner in which energy is transferred from the impacting debris to the window unit by increasing the time duration of the energy transfer, thus reducing the peak load transferred.

Figure 4B:
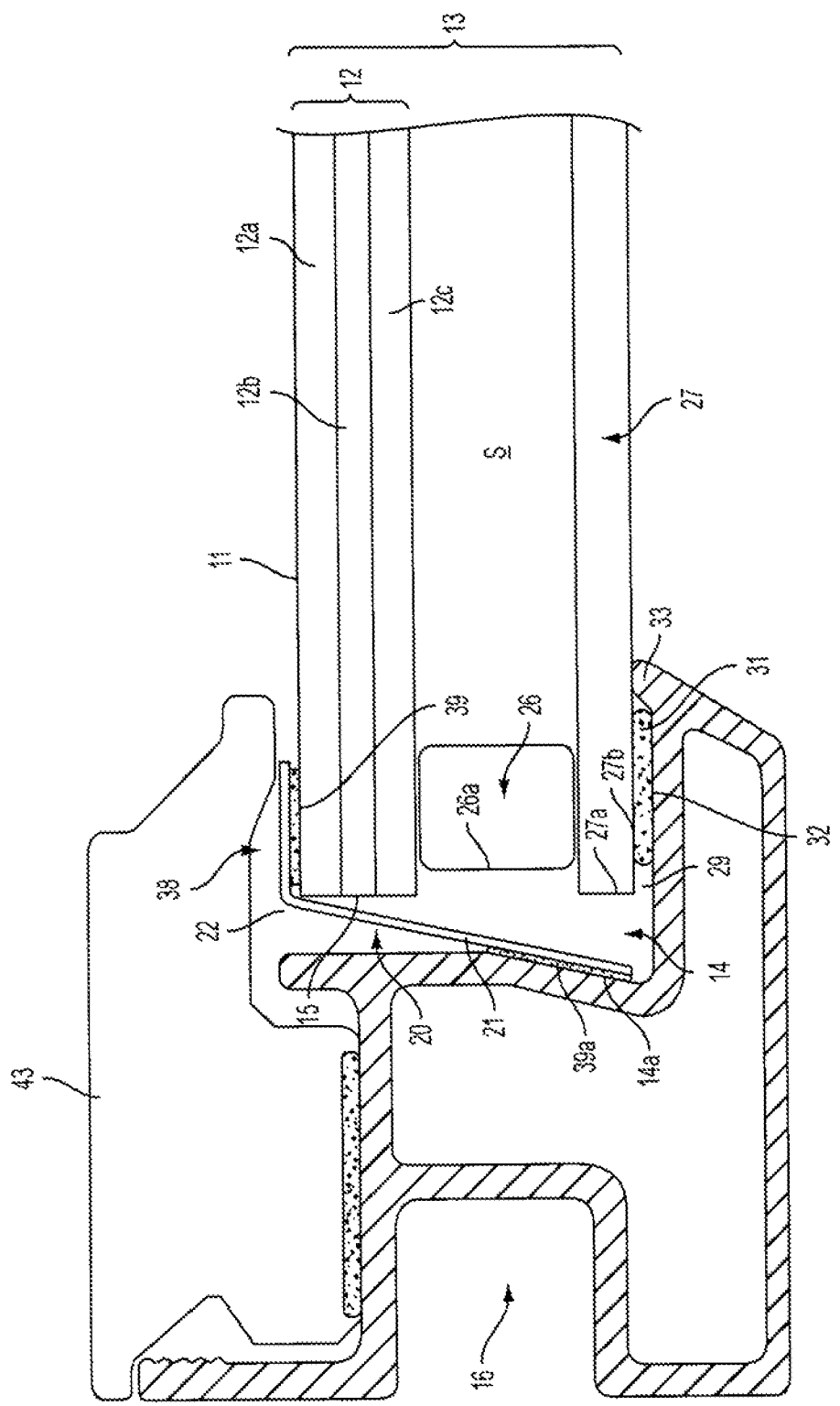
FIG. 4B is a cross-sectional view of an alternate construction of the embodiment of the present invention as illustrated in FIG. 4A.

In another alternative embodiment, shown in FIG. 4B, surface 14a of the channel 14 of the sash or frame assembly or door panel or frame assembly also may be oriented at an angle that improves the coupling between subassembly 13 and the sash by placing the tape material retention member 38 with its base extending along and adhered to the angled surface 14a, such as with an adhesive 39a. Such a mounting arrangement aligns the retention member in a more tensile loading condition during impact, and further places the adhesive bond 39a between the tape material retention member 38 and surface 14a in shear loading condition rather than in a peeling mode during such impact.

Figure 5A:
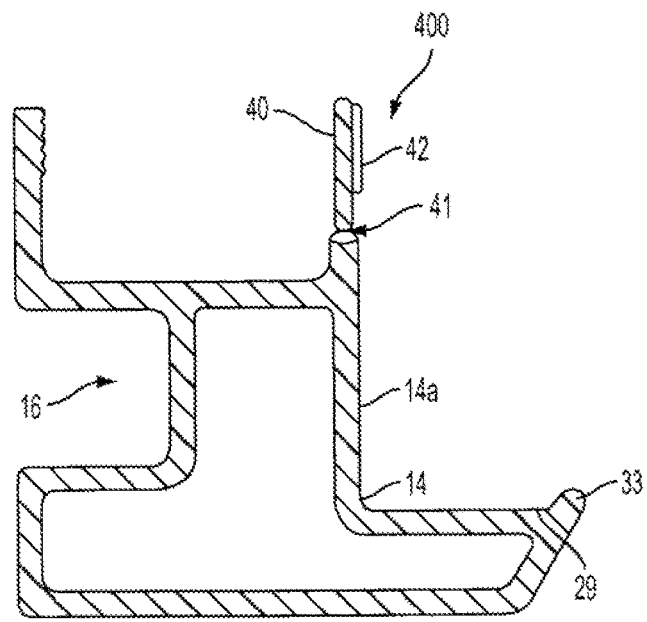
FIGS. 5A-5B are cross-sectional views of yet another embodiment of the present invention incorporating a flexible hinge component as part of the retention member.
Figure 5B:
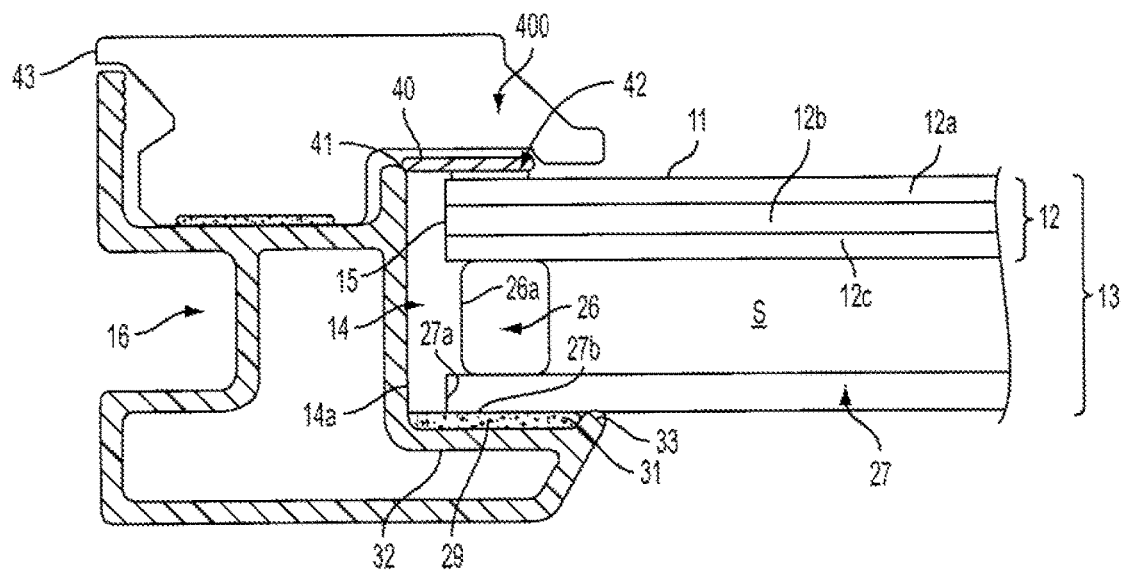

FIGS. 5A and 5B illustrate still a further embodiment of the present invention, wherein the retention member 400 is formed as a flexible or "living" hinge. In this embodiment, as illustrated in FIG. 5A, the retention member 400 includes a leg or body portion 40 formed with or attached to the extruded profile of the window sash or frame member 16 or door panel or frame member by a flexible hinge 41 formed between the leg 40 of the retention member and the extruded profile of the window sash or frame member or door panel or frame member, as will be understood those skilled in the art. As additionally illustrated in FIG. 5A, a tape material 42 generally will be applied to the body 40A in an in-line position. The tape material 42 in this embodiment generally can comprise a VHB type transfer adhesive or other suitable adhesive-backed tape, and can include adhesive material applied to both sides of the tape. The tape material further generally will be applied to the leg of the retention member 40 after extrusion of the window sash or frame member or door panel or frame member profile, and prior to installation of the interior sash component 43 of the window sash or frame member or door panel or frame member, in accordance with the various methods of assembly of a window sash or frame assembly or door panel or frame assembly discussed herein. As FIG. 5B illustrates, the tape material 42 will engage the inside surface 11 of the laminated glass pane/structure 12 of the insulating glass subassembly 13 when folded over into a substantially flat lying attitude against the inside surface of the laminated glass pane/structure. Typically, the leg will be folded over approximately 90° to provide the desired flat lying, in-line engagement with the inside surface of the laminated glass pane/structure.

Figure 8A:
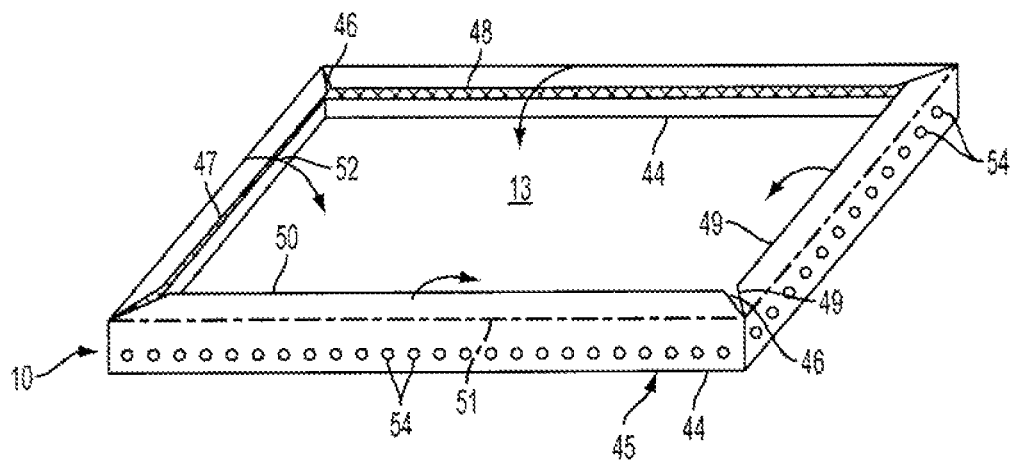
FIG. 8A is a perspective view illustrating one example method of the application of the retention member to a glass subassembly.

An example of a general application process for applying a retention member 10 to an insulating glass subassembly 13, which lends itself to both manual application and machine application, is shown in FIG. 8A. Referring to FIG. 8A, the retention member 10, such as a fibrous tape, PVC strip or similar material typically having an adhesive material applied to an inside surface thereof is first wrapped around and adhered to the edge of the glass subassembly in the manner shown. Positioning of the retention member relative to the glass subassembly can be controlled by aligning a bottom edge 45 of the retention member with a bottom surface 44 of the glass subassembly. While it is convenient to wrap the retention member around the glass subassembly as a single strip, it is also possible to apply the retention member in sections. For example, separate sections could be applied to each side of the glass subassembly. Once the retention member has been adhered to the glass subassembly, notches 46 can be cut in tabs 47, 48, 49 and 50, to produce mitered corners when the tabs are folded down, as indicated along lines 51, in the directions shown by arrows 52, onto the glass subassembly. Once the tabs are folded down and pressed in place to produce an adhesive bond, the glass subassembly can be handled and moved, for, example, to an assembly station for installation in a window sash or frame assembly or door panel or frame assembly.

Figure 8B:
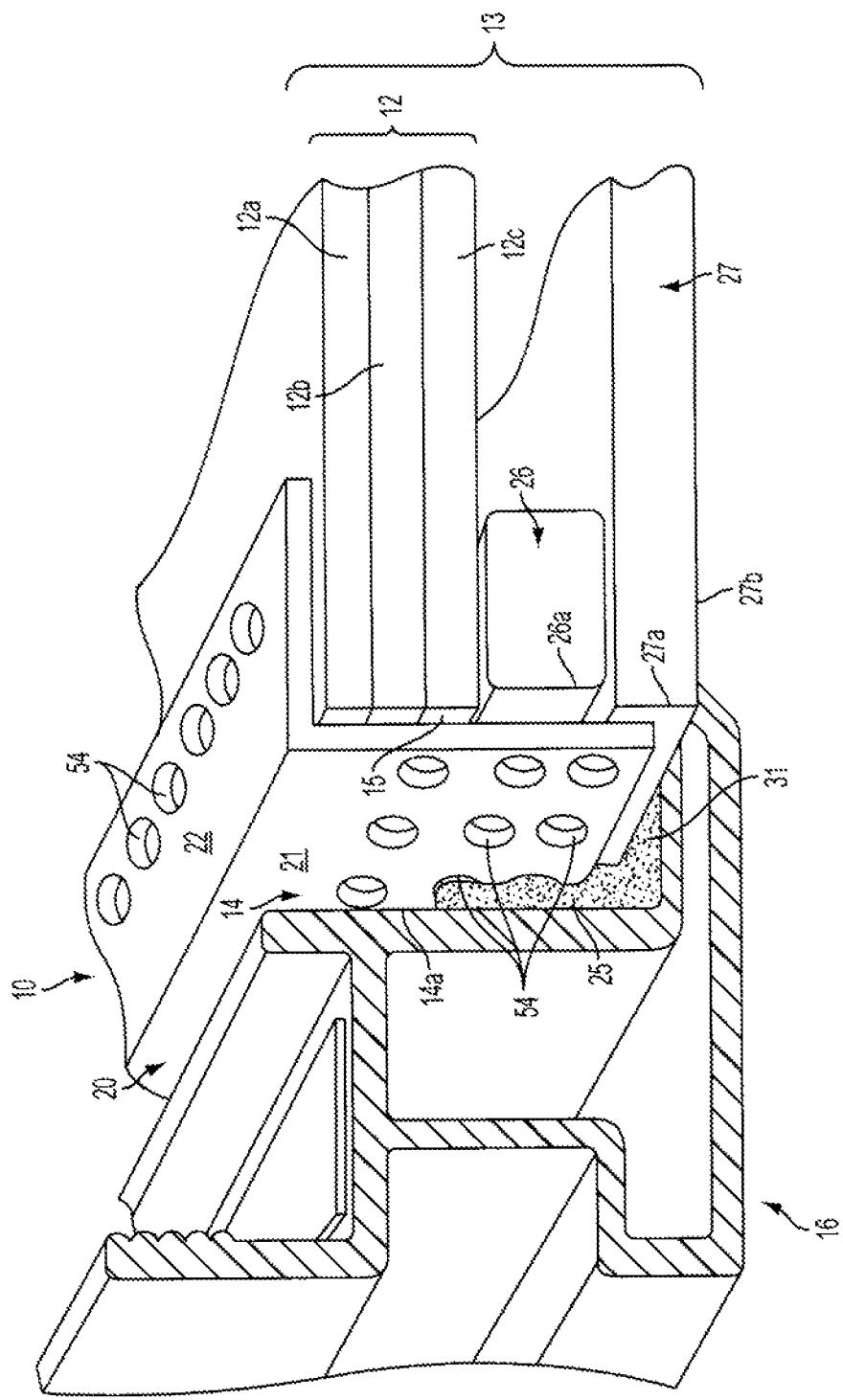
FIG. 8B is a perspective illustration of the retention member with perforations of FIG. 8A applied to an insulating glass assembly.

It will be recognized that the general process portrayed in FIG. 8A lends itself to many possible variations, including both manual and machine application. For example, notches 46 could be pre-cut, before wrapping onto the glass subassembly 13, using suitable methods for properly locating the notches prior to wrapping. In addition, while shaping the notches to provide miter cuts generally provides a smooth surface for the folded over tabs, other notches may be used, where, for example, overlapping of the folded over tabs, or gaps in the tabs, are permissible. Additionally, as indicated in FIG. 8B, the retention member material 10 used for wrapping about the glass subassembly could be provided with a series of perforations, holes, slits or other, similar openings or passages 54 therethrough, or could be a mesh material defining such perforations or passages. The perforations or passages can enable an adhesive material, such as the bed glazing material 31, heel bead 25, or other adhesive material, to flow or pass through the retention member to facilitate engagement and adherence of the adhesive of the retention member to the glass subassembly and to increase the engagement and encapsulation of the retention member by this adhesive material.

Machine wrapping of the retention member 10 onto the edge of insulating glass subassembly 13 can be done in a variety of known ways. For example, tape dispensing heads that carry a roll of the material to be dispensed, remove any protective liner therefrom, position the dispensed material, and press it into place along the edge of insulated glass assembly 13, are well known to those skilled in the art. Positioning and movement of the dispensing head relative to insulating glass subassembly 13 can be done in a variety of ways, some involving movement of the dispensing head relative to insulating glass subassembly 13, and, alternatively, movement of insulating glass subassembly 13 relative to the dispensing head. Devices such as vacuum chucks for holding the insulating glass subassembly 13 while wrapping are well known. Likewise, cutting of the tape material of the retention member to free the dispensing head from the insulating glass subassembly 13 once wrapping is complete can be done in a variety of known ways. In addition, it may be convenient, in some instances, to pre-cut the retention member to a suitable predetermined length prior to wrapping. Folding and pressing of tabs 47-50 can also be done in a variety of known ways, involving, for example, use of one or more rollers to press the tabs into place, use of flat bending and pressing devices, or combinations thereof.

It also will be appreciated that while the present embodiment has been applied to rectangular windows, the same general scheme can also be adapted to apply to other shapes. In addition, while the present embodiment portrays the retention member as a continuous strip, there may be instances wherein a series of separate strips may be used. For example, windows involving circular or other curved shapes may require that the retention member be provided in short strips, or in longer strips with multiple notches of suitable shape.

Control of the steps in the general process of applying the retention member to the insulating glass subassembly 13 may be performed with a range of different levels of mechanization, automation, and integration. For example, the various steps in the process may be performed by separate powered tools designed specifically for each task but controlled manually at each step. Alternatively, the entire process may be controlled electromechanically, using switches, sensors, and other electrical devices to control the entire operation without operator intervention. Yet another level of control can be achieved by use of a digital system, which would enable the system to utilize input to a computer.

Coastal impact window products with insulated window subassemblies including laminated glass layers formed utilizing the retention method and member according to the principles of the present invention have been found to provide mechanical properties that meet or exceed the glazed opening protection requirements of large and small missile impact and pressure cycling tests as set forth in accordance with ASTM E1886 and ASTM E1996 standards, and TAS 201, 202 and 203 (High-Velocity Hurricane Zones—Impact Tests for Wind-Borne Debris) building requirements and AAMA 506 standards. In addition, the use of the retention member can assist in providing additional blast mitigation protections in accordance with ASTMF 1642, GSA T501, AAMA 510, and UFC 4-010 standards, and for security applications to aid in the retention of the laminated glass layer, and the insulating glass subassembly generally, within the window sash or frame assembly or door panel or frame assembly after the glass materials have become broken or cracked and/or following impact of debris thereagainst.

Testing on such products was conducted with a sampling of window units including units described in the above-discussed configurations of the present invention. The windows were subjected to the large and small missile impact and pressure cycling test requirements as set forth in accordance with ASTM E1886 and ASTM E1996 standards, and TAS 201, 202 and 203 (High-Velocity Hurricane Zones—Impact Tests for Wind-Borne Debris) building requirements and AAMA 506 standards. Test results indicated that the use of the retention members described provided enhanced protection against impact and pressure cycling so as to meet or exceed required coastal impact product standards.

Figure 9A:
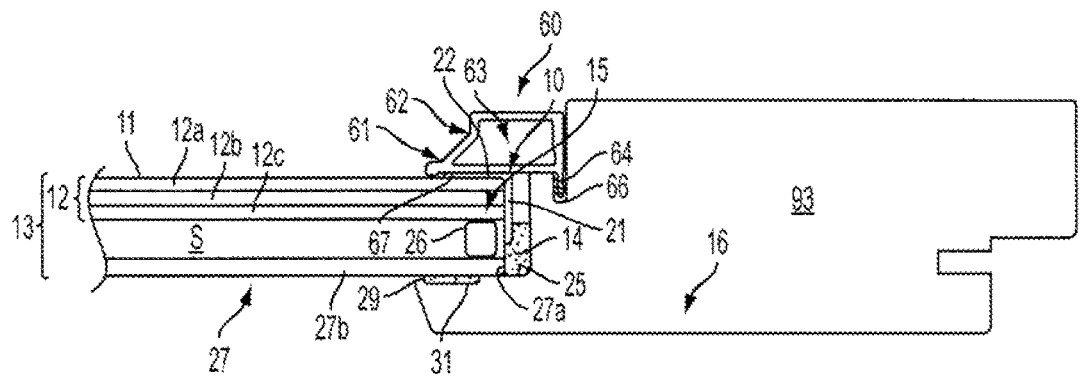
FIGS. 9A-9C illustrate further alternative embodiments of the present invention incorporating the retention member with an interior glass stop for window sash or frame assemblies and/or door panel or frame assemblies.
Figure 9B:
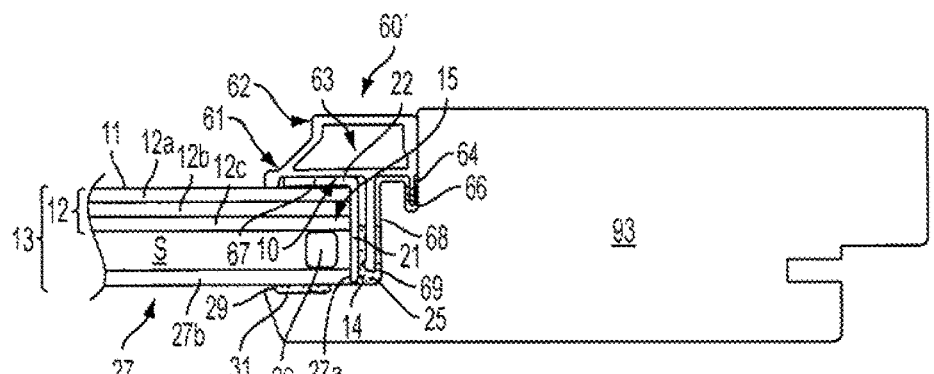
Figure 9C:
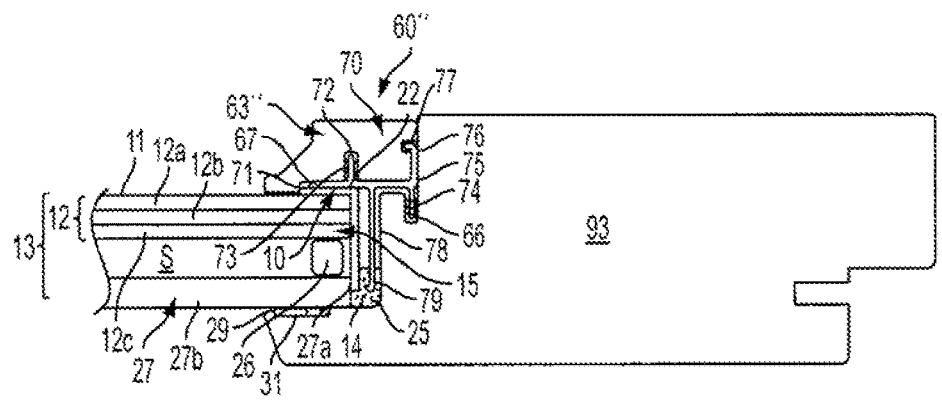

Glass stops can also play a role in enhancing the retention of glass subassemblies in sashes or frames. FIGS. 9A-9D illustrate an alternative embodiment of the present invention, in which the retention member 10 can be used in conjunction with added coupling of interior glass stop 60 to a sash or frame. Such an interior glass stop 60 generally can comprise a vinyl extrusion or similarly formed element 61 that typically can be covered with a veneer wrap 62, such as thin wood veneer or other similar wrapping. FIGS. 9A-9C illustrate various configurations for coupling of the interior glass stop 60, with each of the varying configurations generally including a body portion 63 adapted to engage and connect to the interior sash or door panel component 93 for a window sash or frame assembly or door panel or frame assembly. At least one barbed spline 64-74 generally will be formed along a proximal side of the body of the interior glass stop, and, as illustrated in the drawings, generally can be rolled or otherwise inserted into locking engagement with a kerf 66 of the interior sash or door panel component 93.

As shown in FIGS. 9A-9C, the reinforcing member 90 can be adhered to the interior surface 11 of the laminated glass structure of the insulating glass subassembly 13, and, optionally, to edge 15 of second pane 12b, as in the previously disclosed embodiments. Also as in previous embodiments, member 90 extends into heel bead 25. While any of the previously disclosed retention members may be used in this embodiment, a particularly useful retention member can include a double-sided tape including a substrate material such as a reinforced fiber, woven or non-woven cloth material or reinforcing tape material having an adhesive material applied to both sides. For example, the retention member could include a VHB transfer adhesive or equivalent alternative adhesive material such as supplied by 3M Corporation. As in previously disclosed embodiments, the retention member 90 helps anchor the insulating glass subassembly to the window sash or frame member or door panel or frame member by being embedded in and adhesively bonding to heel bead 25.

Looking at FIG. 9A, which illustrates in more detail a first embodiment of the combined retention member 10 and interior glass stop 60, in which the retention member is applied between the interior surface 11 of the insulating glass subassembly and lower surface 67 of the body of the interior glass stop. In this embodiment, glass stop 60 further includes barbed spline 64 that tightly engages kerf 66 in door panel or frame component 93 to further retain both glass stop 60 as well as glazing unit 13. Such an embodiment can be used in conventional window or door applications to provide an enhanced interior glass stop for the glass subassembly. Additional embodiments of the interior glass stop 60' and 60" are further illustrated in FIGS. 9B and 9C, and can have particular application for use in coastal impact products, due to the additional coupling to heel bead 25. In the embodiment shown in FIG. 9B, the extruded body of the interior glass stop 60' further includes leg 68 that extends downwardly from the lower surface 67 of the body 63, along the channel 14 and generally terminates in a hooked lower end 69, which is embedded in heel bead 25.

Alternatively, as indicated in FIG. 9C, the interior glass stop 60" can be formed with a two-piece structure, including a substantially solid body 63", and a separate connector 70 that attaches thereto and includes a projecting portion 69 that extends into heel bead 25, and that further includes barbed spline 64 that secures the body to door panel or frame component 93. The connector 70 can be extruded, stamped or otherwise formed from various materials, including metal, composite, or synthetic materials, and generally will include a horizontally extending base 71, with the first upstanding barbed spline 72 that engages a kerf 73 formed in the body 63". A second, downwardly extending barbed spline 74 engages the kerf 66 formed in the interior sash component, and further includes an upwardly projecting leg 75 having an inwardly directed hook projection, indicated at 76, that engages a slot or kerf 77 formed along a rearward side of the body 63" of the interior glass stop to help further secure and connect the connector 70 to the body of the interior glass stop 60". In addition, leg 78 extends downwardly from the base 71 and terminates in a substantially hooked or barbed lower end 79, which is embedded in heel bead 25.

Figure 6A:
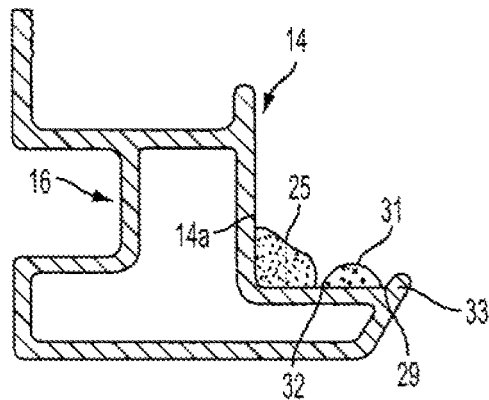
FIGS. 6A-6C are schematic illustrations of one embodiment of a process for applying the retention member to the laminated glass structure prior to assembly of the glass subassembly and sash or frame member.
Figure 6B:
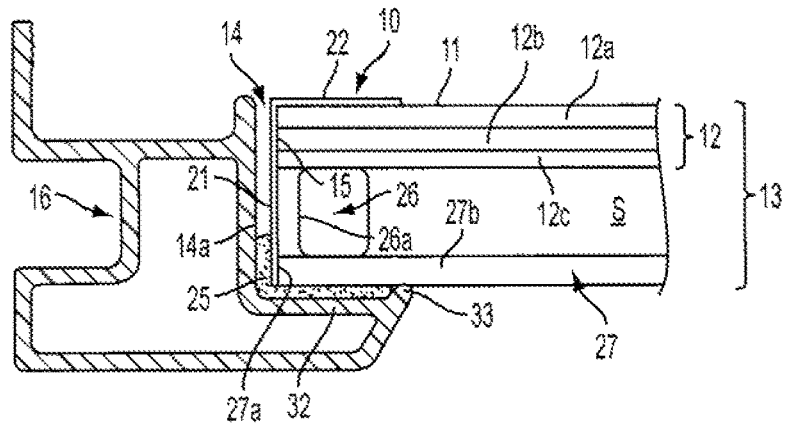
Figure 6C:
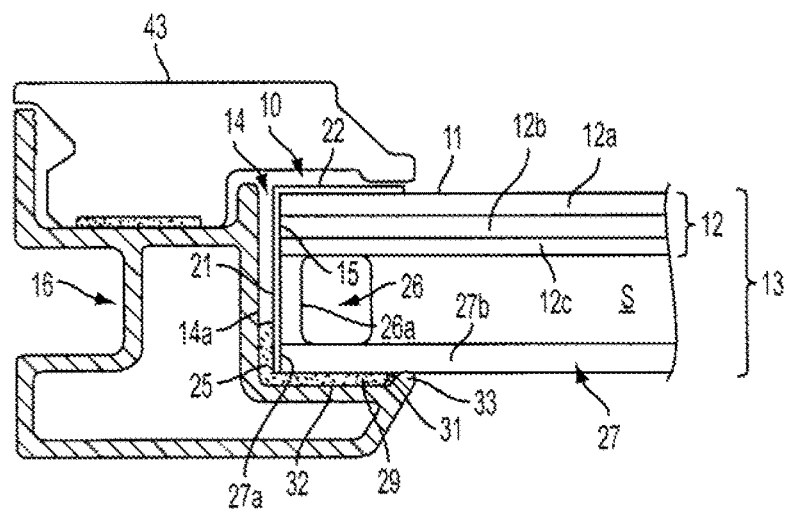

The combination of the retention member 10 and interior glass stop 60' can be assembled to form a window sash or frame assembly or door panel or frame assembly, generally by first applying the retention member, such as using one of the methodologies as discussed above, for example following the process steps as outlined in FIGS. 6A and/or 6B. Thereafter, the interior glass stop can be mounted to the window sash or frame assembly or door panel or frame assembly by placing the body of the interior glass stop over the interior surface of the glass subassembly and urging the barbed spline thereof into the kerf of the interior sash component. As further indicated in the embodiment shown in FIG. 9B, the leg of the interior glass stop likewise will be urged downwardly, through the channel 14 between the glass edge and the interior sash component and/or sash or frame member 16 or door panel or frame member, with the leg projecting into and becoming at least partially enveloped by the heel bead 25 of silicone sealant. Once the sealant has cured, the glass stop will be further rigidly tied to the glass subassembly and to the window sash or frame member 16 and/or interior sash component. The further inclusion of the additional leg with such an interior glass stop profile can additionally help reduce or possibly eliminate the requirement for backfilling the entire cavity between the glass edge and interior sash component and can further provide an additional benefit of performing the function of glass spacers or setting blocks.

In yet other embodiments, such as shown in FIGS. 10A-10C a glass stop that is sufficiently strongly coupled to the frame or sash may provide sufficient retention of the glass subassembly in the frame or sash, without the need for additional retention members. FIGS. 10A and 10B illustrate alternative constructions of the embodiment of the present invention illustrated in FIGS. 10A-10C, wherein a adhesive member 10' is used in conjunction with varying configurations of an interior glass stop 60-60' for windows or patio doors. For example, FIG. 9A illustrates the use of adhesive member 10' with the interior glass stop 60 illustrated in FIG. 9A as including an extruded body 63, veneer wrap 62 and a barbed spline 64 engaging the interior sash component. FIG. 10B illustrates the use of the shortened retention member 10' with the construction of the interior glass stop 60' as shown in FIG. 9B, including an additional downwardly projecting leg 68. In the constructions illustrated in FIGS. 10A-10C, the adhesive member 10' generally can comprise a tape material, such as a VHB tape or similar adhesive-backed tape material. The adhesive member in this embodiment further generally will be of a reduced length so as to extend only along a portion of the inside surface 11 of the insulating glass subassembly 13, shown as being located between the inside surface 11 of the insulating glass subassembly 13 and the lower surface 67 of the body 61 of the interior glass stop 60-60'.

As therefore indicated in FIGS. 10A-10C, the tape material of the adhesive member will not extend about the corner and outside edge 15 of the insulating glass subassembly. Thus, the amount of tape material utilized for the shortened retention member 10' can be reduced while still facilitating the secure seating and mounting of the insulating glass subassembly between the interior glass stop and the window sash or frame member or door panel or frame member, without necessarily requiring the use of additional exposed fasteners such as nails or staples; and which generally meets large and small missile impact and pressure cycling test requirements for coastal impact products, as well as providing enhanced security and resistance to blast migration of the laminated glass structure of the insulating glass subassembly following impact and/or cracking or breaking of such glass materials.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

The invention claimed is:

1. A method of forming a window or door having a glass subassembly with edges surrounded and supported by a frame, the frame and the glass subassembly having an inside surface that faces the inside of a structure when the window or door is installed and an outside surface that faces the outside of a structure when the window or door is installed, the edges of the glass subassembly being seated in a generally L-shaped inside facing channel of the frame with the channel being defined by a peripheral wall and an inside facing attachment surface, the method comprising the steps of:

applying a retention member to the edges of the glass subassembly, the retention member having a first portion that extends along and engages at least part of the edges of the glass subassembly and a second portion that extends along and engages the inside facing surface of the glass subassembly adjacent the edges of the glass subassembly, the retention member having no portion that engages the outside facing surface of the glass subassembly;

inserting the glass subassembly with the retention member applied to its edges into the inside facing channel of a window or door frame member so that the first portion of the retention member is disposed along the inside facing wall of the channel;

seating the edges of the glass subassembly and the first portion of the retention member within a bed of a glazing material applied along the receiving channel; and covering the second portion of the retention member and a portion of the inside facing surface of the glass subassembly with a stop;

whereby the retention member holds the glass subassembly within the channel and improves the resistance of the glass subassembly to being dislodged from the channel.

2. The method of claim 1, further comprising mounting the stop along the frame member, with a leg portion of the retention member extending between the inside facing surface of the glass subassembly and the stop.

3. The method of claim 1, further comprising applying a sealing material between the frame member and the glass subassembly.

4. The method of claim 1, wherein applying a retention member comprises applying a body formed from a polyvinyl chloride, glass composite, polyethylene, nylon, rubber, or elastomeric material or combinations thereof, and wherein the retention member is formed with a substantially L-shaped configuration extending from the portion engaging the inside surface of the glass subassembly and including a base portion extending along and engaging the edges of the glass subassembly and projecting into the bed of glazing material.

5. The method of claim 1, wherein applying a retention member comprises applying a fiberglass cloth or fibrous tape material in an L-shaped configuration extending from a leg portion engaging the inside surface of the glass subassembly and including a base portion extending along and engaging the edges of the glass subassembly and projecting into the bed of glazing material.

\* \* \* \* \*